(12) United States Patent
Taguchi et al.

(10) Patent No.: US 8,403,096 B2
(45) Date of Patent: Mar. 26, 2013

(54) REAR VEHICLE BODY STRUCTURE OF VEHICLE

(75) Inventors: Tomoo Taguchi, Hiroshima (JP);
Hiromichi Kawamura, Hiroshima (JP);
Kouji Iwasaka, Hiroshima (JP)

(73) Assignee: Mazda Motor Corporation (JP)

( * ) Notice: Subject to any disclaimer, the term of this patent is extended or adjusted under 35 U.S.C. 154(b) by 269 days.

(21) Appl. No.: 12/872,628

(22) Filed: Aug. 31, 2010

(65) Prior Publication Data
US 2011/0073390 A1 Mar. 31, 2011

(30) Foreign Application Priority Data

Sep. 30, 2009 (JP) .................................. 2009-227248
Sep. 30, 2009 (JP) .................................. 2009-227260

(51) Int. Cl.
*B60K 6/20* (2007.10)
(52) U.S. Cl. .......................................... 180/291; 180/56
(58) Field of Classification Search .................. 180/291, 180/55, 56, 58, 62, 65.245
See application file for complete search history.

(56) References Cited

U.S. PATENT DOCUMENTS

| | | | | |
|---|---|---|---|---|
| 1,982,316 A * | 11/1934 | Mackenzie | ...................... | 180/55 |
| 3,011,796 A * | 12/1961 | Barenyi | ......................... | 180/295 |
| 3,047,331 A * | 7/1962 | Porsche et al. | .............. | 296/24.33 |
| 3,497,027 A | 2/1970 | Wild | | |
| 3,616,872 A * | 11/1971 | Taylor | .............................. | 180/55 |
| 4,267,895 A * | 5/1981 | Eggert, Jr. | ..................... | 180/68.1 |
| 4,425,976 A * | 1/1984 | Kimura | ............................ | 180/56 |
| 5,454,443 A * | 10/1995 | Fischle et al. | .................. | 180/312 |
| 6,343,669 B2 * | 2/2002 | Davis et al. | .................... | 180/376 |
| 6,722,455 B2 * | 4/2004 | Hurlburt | ....................... | 180/24.12 |
| 6,856,035 B2 * | 2/2005 | Brandon et al. | ............. | 290/40 C |
| 7,768,233 B2 * | 8/2010 | Lin et al. | ......................... | 320/132 |
| 8,118,125 B2 * | 2/2012 | Suzuki et al. | ................. | 180/68.5 |

FOREIGN PATENT DOCUMENTS

| | | |
|---|---|---|
| EP | 0 003 888 A1 | 9/1979 |
| EP | 1 674 317 A1 | 6/2006 |
| JP | 2008-155828 A | 7/2008 |
| WO | 00/30235 A1 | 5/2000 |

OTHER PUBLICATIONS

The extended European Search Report dated Nov. 23, 2010; Application No. 10008693.3-2421.

* cited by examiner

*Primary Examiner* — John Walters
(74) *Attorney, Agent, or Firm* — Studebaker & Brackett PC; Donald R. Studebaker

(57) ABSTRACT

A rear floor panel extends rearwardly from a kick-up portion formed at a rear portion of a floor panel. A lateral connecting member which constitutes part of a rear suspension connects to supporting portions to support both rear wheels. An engine is arranged below the rear floor panel and in front of the lateral connecting member. A generator is arranged below the rear floor panel and in back of the engine. Accordingly, the traveling stability of the vehicle can be improved and the yaw inertia moment of the vehicle can be decreased.

2 Claims, 16 Drawing Sheets

Vehicle Longitudinal Direction
Vehicle Front ⟷ Vehicle Rear

Vehicle Width Direction
Vehicle Left ⟷ Vehicle Right

REAR VEHICLE BODY STRUCTURE OF VEHICLE

BACKGROUND OF THE INVENTION

The present invention relates to a rear vehicle body structure of a vehicle which comprises an internal combustion engine, a generator drivable by the internal combustion engine, a buttery chargeable with en electric power generated by the generator, and an electric motor driving wheels with a supply of an electric power from the buttery.

A so-called electric vehicle equipped with an engine, which comprises an internal combustion engine, a generator drivable by the internal combustion engine, a buttery chargeable with en electric power generated by the generator, and an electric motor driving wheels with a supply of an electric power from the buttery, is known.

Japanese Patent Laid-Open Publication No. 2008-155828 discloses a vehicle which comprises an internal combustion engine which is arranged laterally in an engine room which is partitioned from a vehicle compartment by a dash panel, a generator which is connected to an output shaft of the internal combustion engine which extends rearwardly, a buttery chargeable with en electric power generated by the generator, and an electric motor which is arranged below a vehicle rear panel so as to drive wheels with a supply of an electric power from the buttery. Further, this vehicle comprises a projecting portion which is formed at a front floor panel so as to project upward and connects to the dash panel at its front end so as to open to the inside of the engine room, and the above-described generator is stored below the projection portion.

Herein, in a so-called plug-in hybrid vehicle as a kind of the electric vehicle equipped with an engine, especially, in which the size of the internal combustion engine is so small that it has a superior layout flexibility, it may be considered that the internal combustion engine and the generator are arranged at a rear portion of the vehicle.

In this kind of electric vehicle equipped with an engine in which the internal combustion engine and the generator are arranged at the rear portion of the vehicle, in case of applying a rear suspension which comprises a lateral connecting member which extends in a vehicle width direction and connects to both rear-wheel supporting portions, such as a torsion beam type of rear suspension or a rigid axel type of rear suspension, it may be required to improve thea traveling stability of the vehicle and decrease the yaw inertia moment of the vehicle, by properly arranging the internal combustion engine, generator and lateral connecting member of the rear suspension.

SUMMARY OF THE INVENTION

The present invention has been devised in view of the above-described matter, and an object of the present invention is to provide a rear vehicle body structure of a vehicle which can properly improve the traveling stability of the vehicle and decrease the yaw inertia moment of the vehicle.

According to the present invention, there is provided a rear vehicle body structure of a vehicle, comprising an internal combustion engine, a generator drivable by the internal combustion engine, a buttery chargeable with en electric power generated by the generator, an electric motor driving wheels with a supply of an electric power from the buttery, a rear floor panel extending rearwardly from a kick-up portion at a rear portion of a floor panel, a rear suspension suspending rear wheels, the rear suspension comprising a lateral connecting member which extends in a vehicle width direction and connects to both rear-wheel supporting portions, wherein the internal combustion engine is arranged below the rear floor panel and in front or back of the lateral connecting member of the rear suspension in a vehicle longitudinal direction, and the generator is arranged below the rear floor panel and in back of the internal combustion engine in the vehicle longitudinal direction.

According to the present invention, since the internal combustion engine which has a relatively heavy weight is positioned as forward of the vehicle as possible, the traveling stability of the vehicle can be properly improved and the yaw inertia moment can be properly reduced.

According to an embodiment of the present invention, the internal combustion engine is a reciprocating engine with a single or two cylinders or a rotary engine with a single rotor, an output shaft of which extends in a vertical direction. Thereby, a vertical length of the internal combustion engine can be shorter, so that the rear floor panel can be made properly low.

According to another embodiment of the present invention, the internal combustion engine and the generator are arranged side by side in the vehicle longitudinal direction, and an output shaft of the internal combustion engine and a rotational shaft of the generator are connected via a chain or gear. Thereby, an arrangement space for the chain or gear can be ensured.

According to another embodiment of the present invention, the rear vehicle body structure of a vehicle further comprises a cross member which extends in a vehicle width direction, the internal combustion engine and the generator are supported at the cross member, and the cross member with the internal combustion engine and the generator is attached to a vehicle body. Thereby, the internal combustion engine and the generator can be attached to the vehicle body as a unit, thereby improving the attachment.

According to another embodiment of the present invention, the cross member constitutes part of a sub frame which extend in the vehicle longitudinal and width directions so as to be of a frame shape in a plan view. Thereby, the rigidity can be improved and the NVH characteristic can be improved as well.

According to another embodiment of the present invention, the rear vehicle body structure of a vehicle further comprises another large-sized component other than the internal combustion engine and the generator, and the large-sized component is arranged outside a floor tunnel which is formed at a central portion of the floor panel in a vehicle width direction so as to extend in the vehicle longitudinal direction and project upwardly. Thereby, the floor tunnel can be made properly low and flat.

According to another embodiment of the present invention, the internal combustion engine is arranged below a rear seat which is provided on the rear floor panel. Thereby, the layout can be improved.

According to another embodiment of the present invention, the internal combustion engine is a reciprocating engine with a single or two cylinders, and arranged at a central portion in a vehicle width direction below the rear floor panel so that a cylinder head thereof is directed rearwardly. Thereby, spaces on both sides of the internal combustion engine in the vehicle width direction can be used effectively.

According to another embodiment of the present invention, the internal combustion engine is arranged in front of the lateral connecting member of the rear suspension in the vehicle longitudinal direction, and the generator is arranged in back of the lateral connecting member of the rear suspension in the vehicle longitudinal direction. Thereby, the layout and space can be improved.

According to another embodiment of the present invention, both the internal combustion engine and the generator are arranged in front of the lateral connecting member of the rear suspension in the vehicle longitudinal direction. Thereby, since both the internal combustion engine and the generator which have a relatively heavy weight are positioned as forward of the vehicle as possible, the yaw inertia moment can be further decreased.

According to another embodiment of the present invention, the rear vehicle body structure of a vehicle further comprises a fuel tank for the internal combustion engine which is arranged inside a floor tunnel which is formed at a central portion of the floor panel in a vehicle width direction so as to extend in the vehicle longitudinal direction and project upwardly. Thereby, there is no need of providing any arrangement space for the fuel tank at a front portion or a rear portion of the vehicle, so that the longitudinal length of the vehicle can be shorter.

According to another embodiment of the present invention, at least part of the buttery is arranged inside a floor tunnel which is formed at a central portion of the floor panel in a vehicle width direction so as to extend in the vehicle longitudinal direction and project upwardly, and a fuel tank for the internal combustion engine is arranged on one side of the internal combustion engine in the vehicle width direction below the rear floor panel. Thereby, there is no need of providing any arrangement space for the buttery at the front portion or the rear portion of the vehicle, so that the longitudinal length of the vehicle can be shorter.

According to another embodiment of the present invention, an intake system of the internal combustion engine is arranged in front of the lateral connecting member of the rear suspension in the vehicle longitudinal direction below the rear floor panel so as to extend toward one side in a vehicle width direction from the internal combustion engine, and an exhaust system of the internal combustion engine is arranged below the rear floor panel so as to extend rearwardly from the internal combustion engine, passing over the lateral connecting member of the rear suspension. Thereby, both the air intake into the internal combustion engine and the combusted-gas exhaustion from the engine can be easily conducted.

According to another embodiment of the present invention, both the internal combustion engine and the generator are arranged in back of the lateral connecting member of the rear suspension in the vehicle longitudinal direction. Thereby, the space in front of the lateral connecting member of the rear suspension can be used effectively.

According to another embodiment of the present invention, an intake system of the internal combustion engine is arranged below the rear floor panel so as to extend forwardly from the internal combustion engine, passing over the lateral connecting member of the rear suspension, and a specified portion of the intake system which is positioned in front of the lateral connecting member, a fuel tank for the internal combustion engine, and an inverter for the generator are arranged in front of the lateral connecting member below the rear floor panel so as to be positioned side by side in a vehicle width direction. Thereby, the space in front of the lateral connecting member of the rear suspension can be used effectively.

According to another embodiment of the present invention, an intake system of the internal combustion engine is arranged below the rear floor panel so as to extend forwardly from the internal combustion engine, passing over the lateral connecting member of the rear suspension, and an exhaust system of the internal combustion engine is arranged in back of the lateral connecting member of the rear suspension below the rear floor panel. Thereby, both the air intake into the internal combustion engine and the combusted-gas exhaustion from the engine can be easily conducted.

Other features, aspects, and advantages of the present invention will become apparent from the following description which refers to the accompanying drawings.

BRIEF DESCRIPTION OF THE DRAWINGS

FIG. 19 is a schematic side view showing the attachment of the internal combustion engine and the generator to the sub frame according to the fourth embodiment.

FIG. 20 is a schematic rear view showing the attachment of the internal combustion engine and the generator to the sub frame according to the fourth embodiment.

DETAILED DESCRIPTION OF THE INVENTION

Hereinafter, preferred embodiments of the present invention will be described referring to the accompanying drawings.

Embodiment 1

—System Structure of Electric Vehicle—

Figure 1:
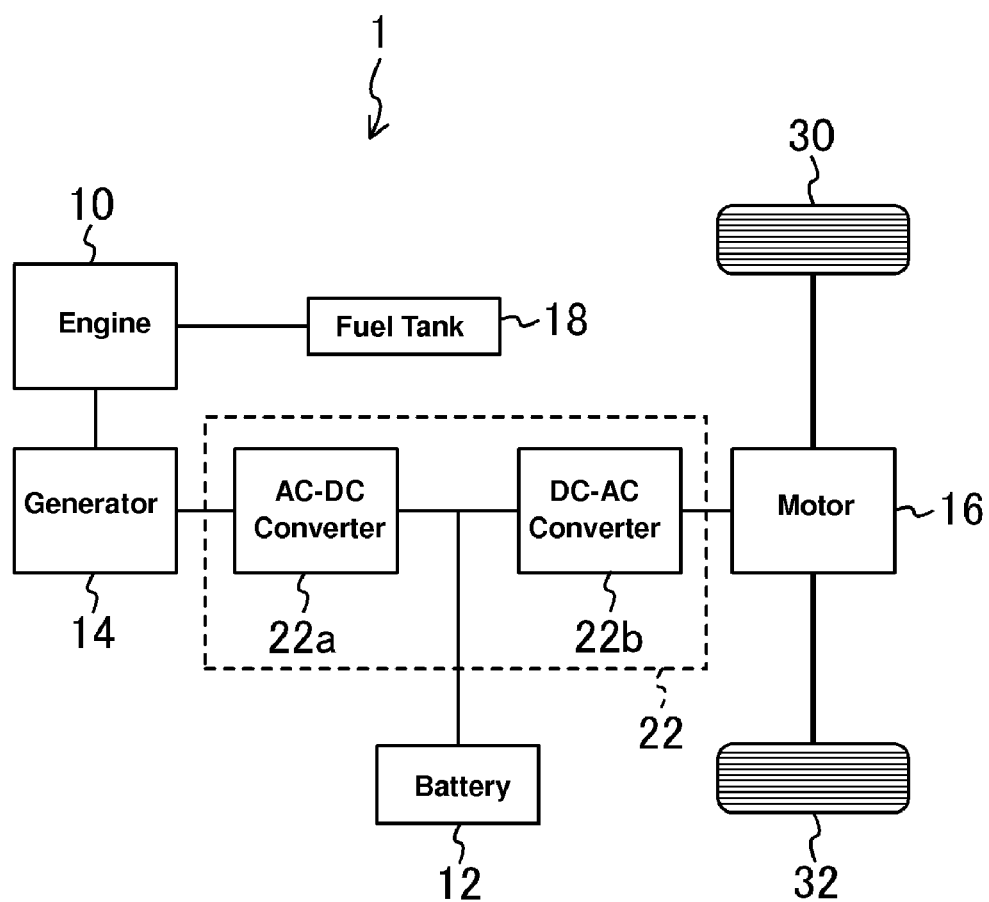
FIG. 1 is a block diagram of an electric vehicle equipped with an engine according to a first embodiment of the present invention.

FIG. 1 is a block diagram of an electric vehicle equipped with an engine. This electric vehicle (hereinafter, referred to as "vehicle" simply) 1 is a so-called plug-in hybrid vehicle, in which wheels of the vehicle are driven by a motor 16 with a supply of an electric power from a buttery 12 which has been charged with an outer electric power from an electric source at home or at any other facilities during a short-distance vehicle traveling (50 km or less, for example), whereas the wheels of the vehicle are driven by the motor 16 with a supply of an electric power from the buttery 12 which has been charged with an electric power from a generator 14 which is driven by an internal combustion engine (hereinafter, referred to as "engine") 10. This plug-in hybrid vehicle is a series type of hybrid vehicle, which is equipped with a drive source comprising the engine 10 and the motor 16, and the engine 10 is used only for generating the electric power and a drive force of the wheels is supplied from the motor 16 only, as described above.

Figure 3:
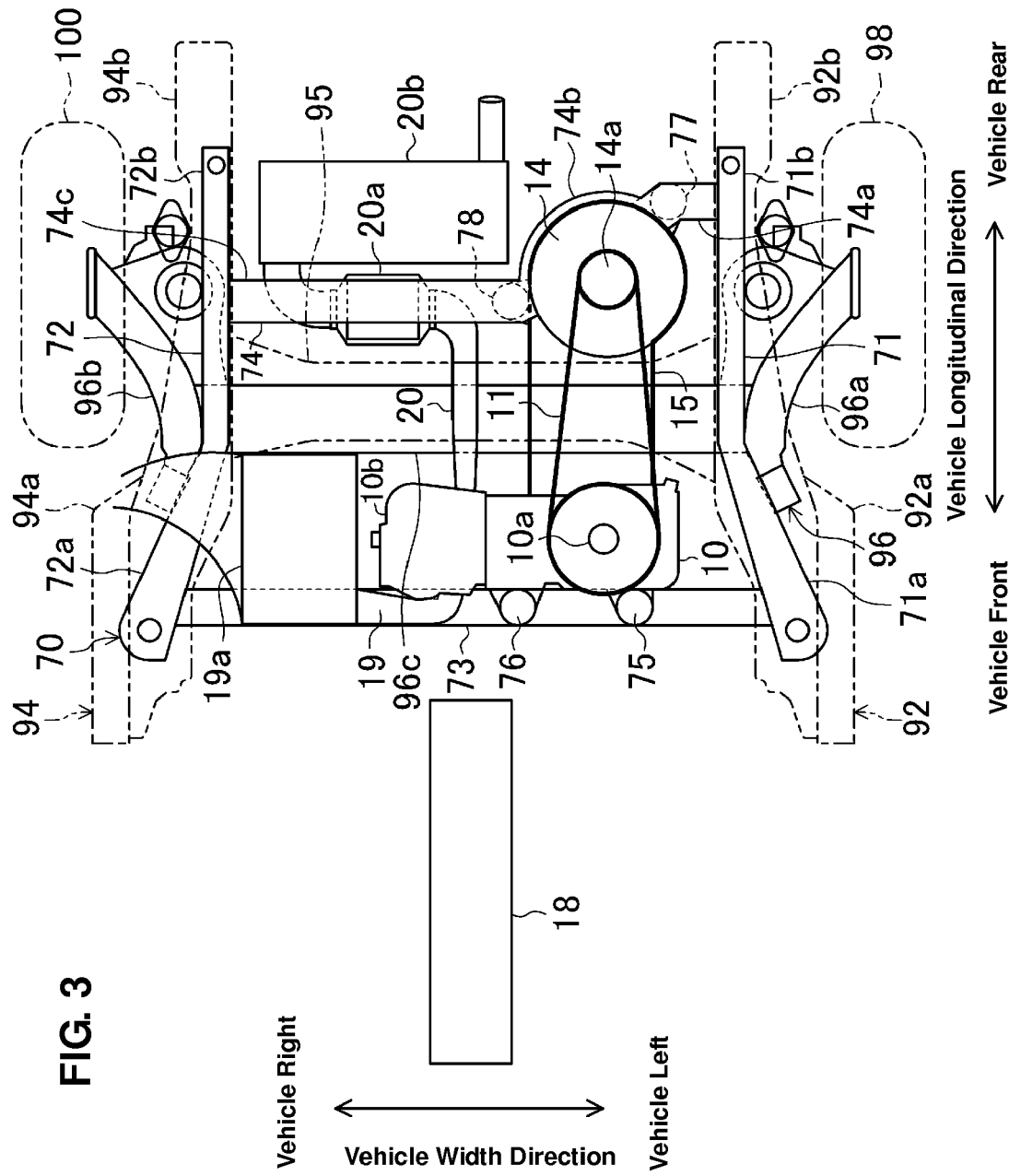
FIG. 3 is a schematic plan view showing a rear structure of the electric vehicle according to the first embodiment.

The above-described engine 10 is a small-sized reciprocating engine equipped with two cylinders which are arranged in line in a direction of a crank shaft (i.e., output shaft) 10a (see FIG. 3 and others). In this reciprocating engine, pistons are driven (reciprocated) in the cylinders by an energy generated through combustion of fuel (e.g., gasoline) supplied from a fuel tank 18 for this engine, and reciprocating move of the pistons is transferred to a rotational move via their connecting rods and the crank shaft 10a. An intake passage (intake pipe) 19 (corresponding to "intake system of the engine": see FIG. 3 and others) and an exhaust passage (exhaust pipe) 20 (corresponding to "exhaust system of the engine": see FIG. 3 and others) are connected to the cylinders. A downstream part of the intake passage 19 branches into two passages, which connect to the two cylinders respectively. The intake passage 19 includes an air cleaner 19a equipped with a filter to remove any particles and dusts in the intake air. An upstream part of the exhaust passage 20 branches into two passages, which connect to the two cylinders respectively. The exhaust passage 20 includes an exhaust-gas purifying device 20a equipped with a three-way catalyst to purify poisonous emission, such as HC, CO or NOx, in the exhausted gas. Further, the exhaust passage 20 includes a muffler 20b to decrease an exhaust noise by suppressing an energy-pressure change of an exhaust-gas combustion sound at a position downstream of the exhaust-gas purifying device 20a. Herein, the operation of the engine 10 is switched to an automatic operation when a residual charge quantity of the buttery 12 becomes small (e.g., 30% of SOC (a state of charge) or less). Herein, the engine 10 is small-sized as described above, so the small-sized ones are applied as the fuel tank 18 and the air cleaner 19a as well.

The buttery 12, which is a large-sized and high-performance one, is connected to the generator 14 and the motor 16 via an inverter 22 so that the generated electric power from the generator 14 and the regenerative electric power the motor 16 are supplied thereto. The battery 12 is also chargeable with the electric power from the outer electric source when the vehicle 1 is not operated. The buttery 12 supplies the electric power to the motor 16 for drive.

A rotational shaft (input shaft) 14a (see FIG. 3 and others) of the generator 14 is connected to the crank shaft 10a of the engine 10, so that the generator 14 is drivable by the engine 10. A rotational shaft (output shaft) of the motor 16 is connected to front wheels 30, 32 as wheels of the vehicle, so that the front wheels 30, 32 are driven by the motor 16 with the supply of the electric power from the buttery 12 and/or the generator 14.

The inverter 22 integrally comprises an AC-DC converter (an inverter for the generator 14) 22a which converts the alternating current to the direct current and a DC-AC converter (an inverter for the motor 16) 22b which converts the direct current to the alternating current, and conducts transfer and conversion of the electric power among the buttery 12, the generator 14 and the motor 16. Specifically, when the buttery 12 is charged with the electric power from the generator 14, the alternating current from the generator 14 is converted to the direct current by the AC-DC converter 22a and then supplied to the buttery 12. When the electric power from the buttery 12 is supplied to the motor 16, the direct current from the buttery 12 is converted to the alternating current by the DC-AC converter 22b and then supplied to the motor 16. Further, when the electric power from the generator 14 is supplied to the motor 16, the alternating current from the generator 14 is converted to the direct current by the AC-DC converter 22a and then this converted direct current is converted to the alternating current by the DC-AC converter 22b and finally supplied to the motor 16.

—Rear Structure of Electric Vehicle—

Figure 2:
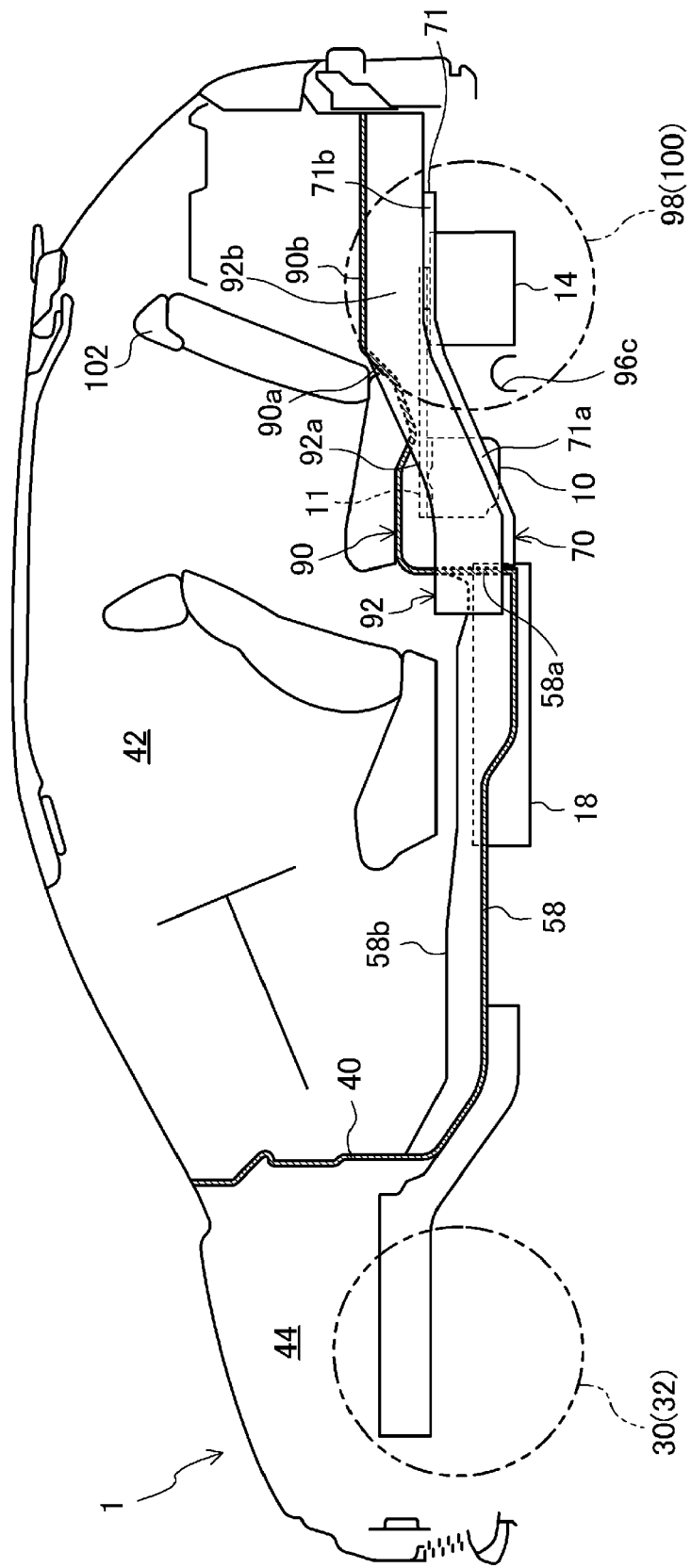
FIG. 2 is a schematic side view showing a whole structure of the electric vehicle according to the first embodiment.
Figure 4:
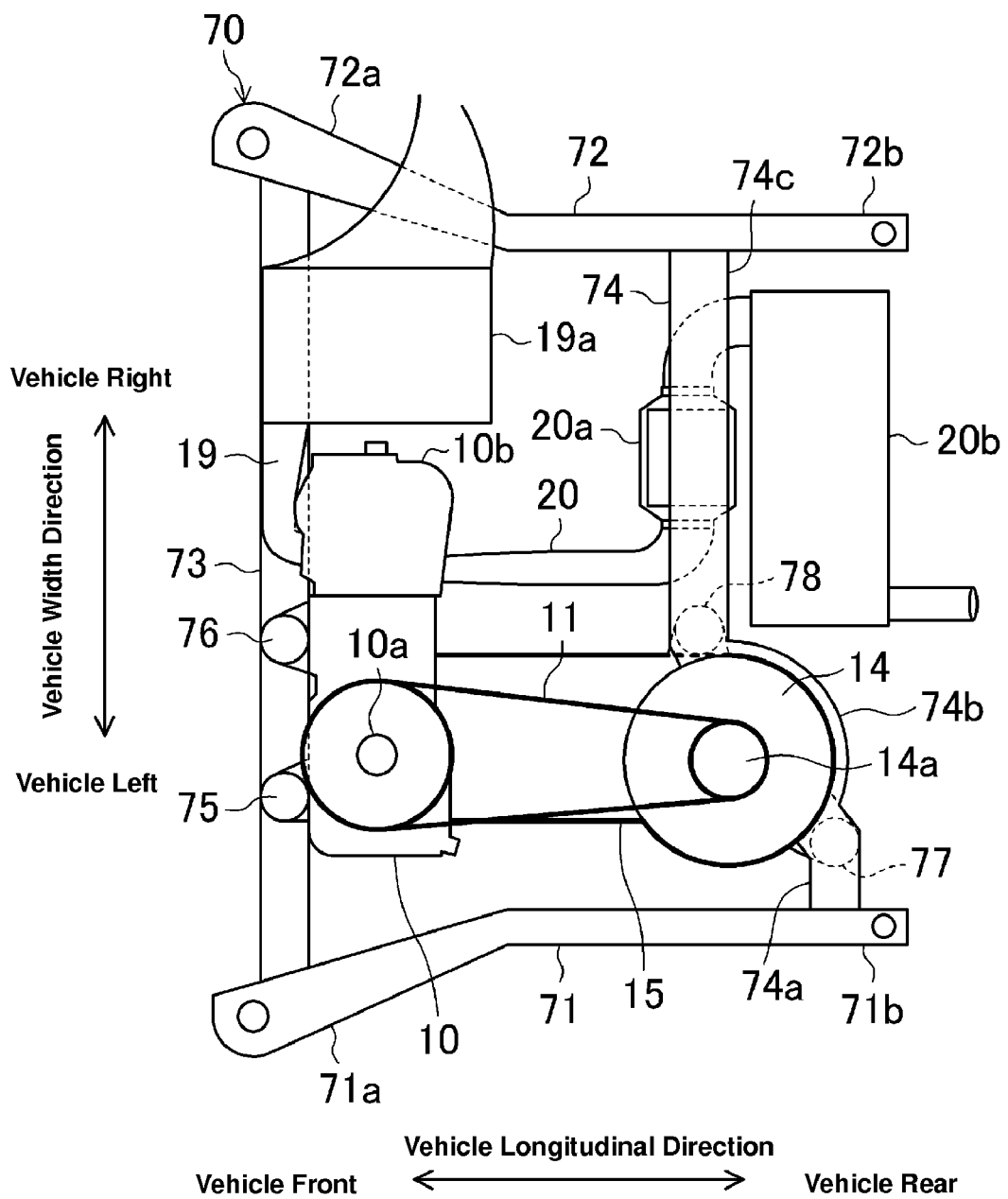
FIG. 4 is a schematic plan view showing an attachment of an internal combustion engine and a generator to a sub frame according to the first embodiment.
Figure 5:
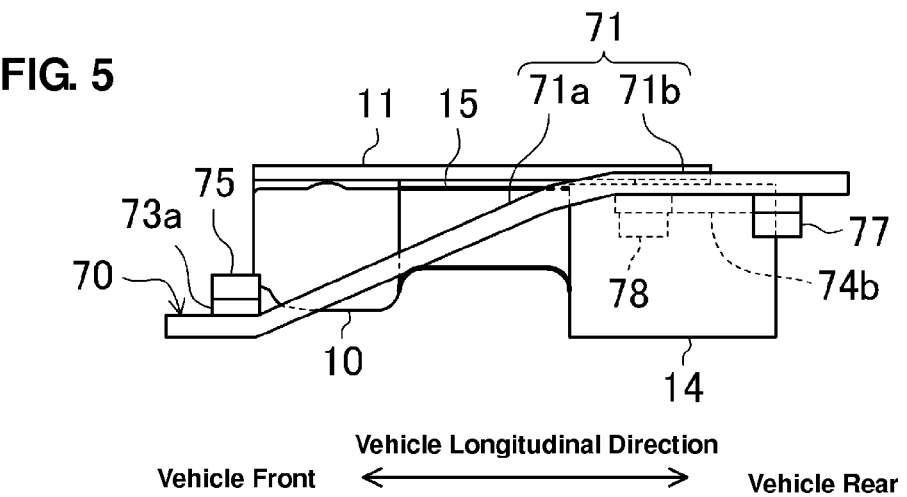
FIG. 5 is a schematic side view showing the attachment of the internal combustion engine and the generator to the sub frame according to the first embodiment.
Figure 6:
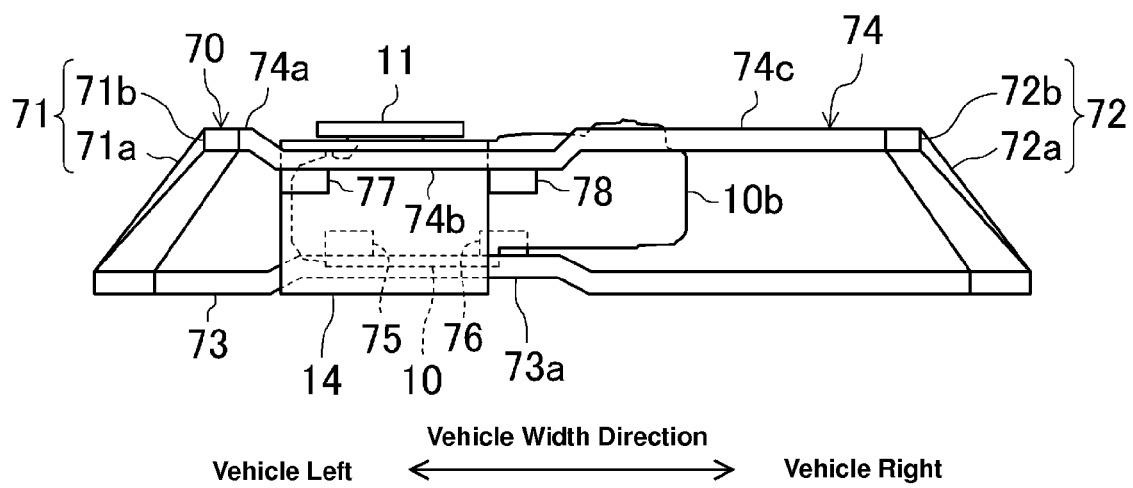
FIG. 6 is a schematic rear view showing the attachment of the internal combustion engine and the generator to the sub frame according to the first embodiment.

Hereinafter, a rear vehicle body structure of the electric vehicle 1 will be described. FIG. 2 is a schematic side view showing a whole structure of the electric vehicle 1 according to the first embodiment. FIG. 3 is a schematic plan view showing a rear structure of the electric vehicle. FIG. 4 is a schematic plan view showing an attachment of the engine and the generator to a sub frame. FIG. 5 is a schematic side view showing the attachment of the engine and the generator to the sub frame. FIG. 6 is a schematic rear view showing the attachment of the engine and the generator to the sub frame. In these figures, illustrations of some components are omitted or simplified for an easy observation of the drawings.

A kick-up portion 58a is formed at a rear portion of a floor panel 58 so as to rise upward, and a rear floor panel 90 is formed so as to extend rearwardly from the kick-up portion 58a. A bench type of rear seat 102 is arranged on a front portion of this rear floor panel 90. A rising portion 90a is formed at a portion of the rear floor panel 90 behind the rear seat 102, and a baggage-compartment floor 90b extends rearwardly from this rising portion 90a. Thus, the baggage-compartment floor 90b constitutes a rear portion of the rear floor panel 90. A pair of rear side frames 92, 94 is arranged at both sides of the vehicle below the rear floor panel 90 so as to extend in the vehicle longitudinal direction. The rear side frames 92, 94 comprise slant portions 92a, 94a which extend obliquely, upwardly and rearwardly, and horizontal portions 92b, 94b which extend rearwardly horizontally from rear ends of the slant portions 92a, 94a, respectively. The slant portions 92a, 94a expand outwardly in a vehicle forward direction. A rear cross member 95 is arranged below a central portion of the rear floor panel 90 in the vehicle longitudinal direction so as to interconnect respective central portions of the pair of rear side frames 92, 94.

Rear wheels 98, 100 are suspended by a torsion beam type of suspension 96 which comprises a pair of training arms 96a, 96b and a cross beam 96c. The cross beam 96c is arranged below the central portion of the rear floor panel 90 (specifically, the rising portion 90a) and rear cross member 95 so as to extend in the vehicle width direction. The arrangement position of the rear cross member 95 in the vehicle longitudinal direction is near front ends of the rear wheels 98, 100. This cross member 95 constitutes a lateral connecting member which connects to the trailing arms 96a, 96b as both rear-wheel supporting portions to support the rear wheels 98, 100.

The engine 10 is provided in front of the cross beam 96c below the central portion of the rear floor panel 90 so that its crank shaft 10a extends in a vertical direction. Specifically, the engine 10 is arranged below the front portion of the rear floor panel 90 slightly on the left side so that its side of cylinder head 10b is directed to the right of the vehicle and its intake side is directed to the front of the vehicle. Further, the engine 10 is arranged below the rear seat 102 on the rear floor panel 90. The crank shaft 10a of the engine 10 is positioned on the left side of the engine 10.

The generator 14 is arranged in back of the cross beam 96c (i.e., in back of the engine 10) below the rear floor panel 90 slightly on the left side so that the rotational shaft 14a extends in the vertical direction. Specifically, the generator 14 is arranged in back of the engine 10 below the front portion of the baggage-compartment floor 90b. Thus, the engine 10 and the generator 14 are arranged side by side in the vehicle longitudinal direction. The generator 14 and the engine 10 are disposed so that the position of the rotational shaft 14a of the generator 14 aligns with the position of the crank shaft 10a of the engine 10 in the vehicle longitudinal direction in the plan view of the vehicle. The rotational shaft 14a is connected to the crank shaft 10a of the engine 10 via a chain 11. This chain 11 extends from a left upper portion of the engine 10 to an upper face of the generator 14, passing over the cross beam 96c, without interfering with the rear floor panel 90. A reduction ratio of a sprocket of the chain 11 (i.e., a reduction ratio from the engine 10 to the generator 14) is set at one half, for example. A rotational speed of the engine 10 is about 2000 rpm, for example. Thus, a rotational speed of the generator 14 is about 4000 to 5000 rpm. A height of an upper face of the generator 14 is the same as that of an upper face of the engine 10. The generator 14 is integrally connected to a left rear-side face of the engine 10 via a connecting member 15, and preferably the generator 14 and the engine 10 are integrally stored in a casing as the connecting member 15.

Herein, the engine 10 and the generator 14 are arranged so as to prevent any interference with the cross beam 96c moving vertically and ensure a necessary height from the ground. While the engine 10 and the generator 14 are arranged so that both the crank shaft 10a and the rotational shaft 14a extend in the vertical direction in the present embodiment, the arrangement of the engine 10 and the generator 14 may be set so that respective axes of the shafts 10a, 14a are positioned so as to be slant forwardly relative to the vertical direction.

The fuel tank 18 is arranged at a rear portion in the floor tunnel 58b.

The above-described intake passage 19 is arranged below the rear floor panel 90 so as to extend from a front portion of the engine 10 to the right of the vehicle. The air cleaner 19a is arranged below the rear floor panel 90 at a specified position which is in front of the cross beam 96c and on the right side of the engine 10.

The above-described exhaust passage 20 is arranged below the rear floor panel 90 so as to extend rearwardly from a right rear-portion of the engine 10, passing over the cross beam 96c, and to the right of the vehicle, and then to the rear of the vehicle. Then, the exhaust passage 20 extends to the left of the vehicle, and finally to the rear of the vehicle. The above-described exhaust-gas purifying device 20a is disposed below the rear floor panel 90 at a specified position which is in back of the cross beam 96c and on the right side of the generator 14. The above-described muffler 20b is provided below the rear floor panel 90 behind the exhaust-gas purifying device 20a on the right side of the generator 14.

The engine 10, generator 14, air cleaner 19a, exhaust-gas purifying device 20a, and muffler 20b are arranged between the pair of rear side frame 92, 94. The engine 10, generator 14, and air cleaner 19a are attached to the rectangular-frame-shaped sub frame 70. Hereinafter, the attachment of these will be described.

The sub frame 70 suppresses transmission of vibrations of the engine 10, and is arranged below the rear side frames 92, 94. The sub frame 70 comprises left and right side frames 71, 72 which extend in the vehicle longitudinal direction, a front frame 73 (cross member) which extends in the vehicle width direction and connects to front end portions of the side frames 71, 72, and a rear frame 74 (cross member) which extends in the vehicle width direction in back of and in parallel to the front frame 73 and connects to rear portions of the side frames 71, 72.

The side frames 71, 72 comprise slant portions 71a, 72a which extend obliquely, rearwardly and upwardly, so as to correspond to the slant portions 92a, 94a of the rear side frames 92, 94, and horizontal portions 71b, 72b which extend horizontally rearwardly from rear ends of the slant portions 71a, 72a so as to correspond to the horizontal portions 92b, 94b of the rear side frames 92, 94. The slant portions 71a, 72a expand outwardly in the vehicle forward direction so as to correspond to the slant portions 92a, 94a of the rear side frames 92, 94.

A projecting portion 73a which projects upwardly is formed at a left portion of the front frame 73. The rear frame 74 comprises a first horizontal portion 74a which extends horizontally to the vehicle right from a rear end portion of the horizontal portion 71b of the left side frame 71, a curve portion 74b which extends to the vehicle right from a right end of the first horizontal portion 74a and then curves to the right and rear of the vehicle so as to correspond to the generator 14 in the plan view, and a second horizontal portion 74c which extends horizontally from a right end (front end) of the curve portion 74b to the vehicle right and then reaches a front end portion (i.e., a portion in front of a connection portion of the rear frame 74 and the left side frame 71) of the horizontal portion 72b of the right side frame 72. The curve portion 74b is provided in a concave shape at a portion which corresponds to the above-described projecting portion 73a of the front frame 73. A height of the rear frame 74 is higher than that of the front frame 73. A lower face of the curve portion 74b is located at a higher position than an upper face of the projecting portion 73a.

An integrated unit comprising the engine 10 and the generator 14 is resiliently mounted on the upper face of the projecting portion 73a of the front frame 73 via mounts 75, 76 which are provided at a front face of a lower left portion of the engine 10, and mounted on the lower face of the curve portion 74b of the rear frame 74 via mounts 77, 78 which are provided at both sides of an upper portion of the generator 14. A basic structure of these mounts 75-78 is well known, so its detailed description is omitted here.

Herein, the air cleaner 19a is attached onto the upper face of a right portion of the front frame 73. The exhaust-gas purifying device 20a is arranged below the second horizontal portion 74c of the rear frame 74. The sub frame 70 to which the engine 10, generator 14 and air cleaner 19a are attached is attached to lower faces of the rear side frames 92, 94 at the side frames 71, 72. That is, after the engine 10, generator 14 and air cleaner 19a are attached to the sub frame 70, this sub frame 70 with the engine 10, generator 14 and air cleaner 19a is attached to the rear side frames 92, 94.

As described above, the engine 10, generator 14 and others are supported at the vehicle body. Hereinafter, a front vehicle structure of the electric vehicle 1 will be descried.

At a front portion of the vehicle 1 is provided a vehicle front space 44 which is partitioned from a vehicle compartment 42 by a dash panel 40. The dash panel 40 rises upwardly from a front end of the floor panel 58 and extends in the vehicle width direction. A floor tunnel 58b is formed at a central portion of the floor panel 58 so as to extend rearwardly (in the vehicle longitudinal direction) from the dash panel 40 and project upwardly, and this floor tunnel 58b reaches the kick-up portion 58a. The buttery 12, motor 16, inverter 22 and others are arranged in the vehicle front space 44 (their illustrations are omitted in FIG. 2).

—Effects—

According to the present embodiment, since the engine 10 is arranged in front of the cross beam 96c below the rear floor panel 90 and the generator 14 is arranged in back of the engine 10 below the rear floor panel 90, the engine 10 which has the relatively heavy weight is positioned as forward of the vehicle as possible, so that the traveling stability of the vehicle can be properly improved and the yaw inertia moment can be properly reduced. Since the engine 10 is arranged below the rear seat 102, the layout can be improved. Since the engine 10 is the reciprocating engine with two cylinders, the crank (output) shaft 10a of which extends in the vertical direction, the vertical length of the engine 10 can be shorter, so that the rear floor panel 90 can be made properly low. Since the engine 10 and the generator 14 are arranged side by side in the vehicle longitudinal direction, an arrangement space for the chain 11 can be ensured. Since the crank (output) shaft 10a of the engine 10 and the rotational shaft 14a of the generator 14 are connected via the chain 11, the layout flexibility of the engine 10 and the generator 14 can be improved, and the rotational speed of the engine 10 and the generator 14 can be adjusted properly.

Further, since the engine 10 is arranged in front of the cross beam 96c and the generator 14 is arranged in back of the cross beam 96c, the layout and space can be improved. Since the fuel tank 18 for the engine 10 is arranged in the floor tunnel 58b, there is no need of providing any arrangement space for the fuel tank 18 at the front portion or the rear portion of the vehicle, so that the longitudinal length of the vehicle can be shorter. Since the intake passage 19 of the engine 10 is arranged in front of the cross beam 96c below the rear floor panel 90 so as to extend to the right side of the vehicle from the engine 10, the air intake into the engine 10 can be easily conducted. Likewise, since the exhaust passage 20 of the engine 10 is arranged below the rear floor panel 90 so as to extend rearwardly from the engine 10, passing over the cross beam 96c, the combusted-gas exhaustion from the engine 10 can be easily conducted.

Moreover, since the cross member with the engine 10 and the generator 14 (i.e., the front frame 73 and the rear frame 74) is attached to the rear side frames 92, 94, the engine 10 and the generator 14 can be attached to the vehicle body as a unit, thereby improving the attachment. Since the above-described cross members 73, 74 constitute part of the sub frame 70, the rigidity can be improved and the NVH characteristic can be improved.

Herein, while the crank (output) shaft 10a of the engine 10 and the rotational shaft 14a of the generator 14 are connected via the chain 11 in the above-described embodiment, they may be connected by a gear instead. Further, the engine 10 and the generator 14 may be formed separately instead of the above-described structure in which they are formed integrally in the present embodiment.

Embodiment 2

Figure 7:
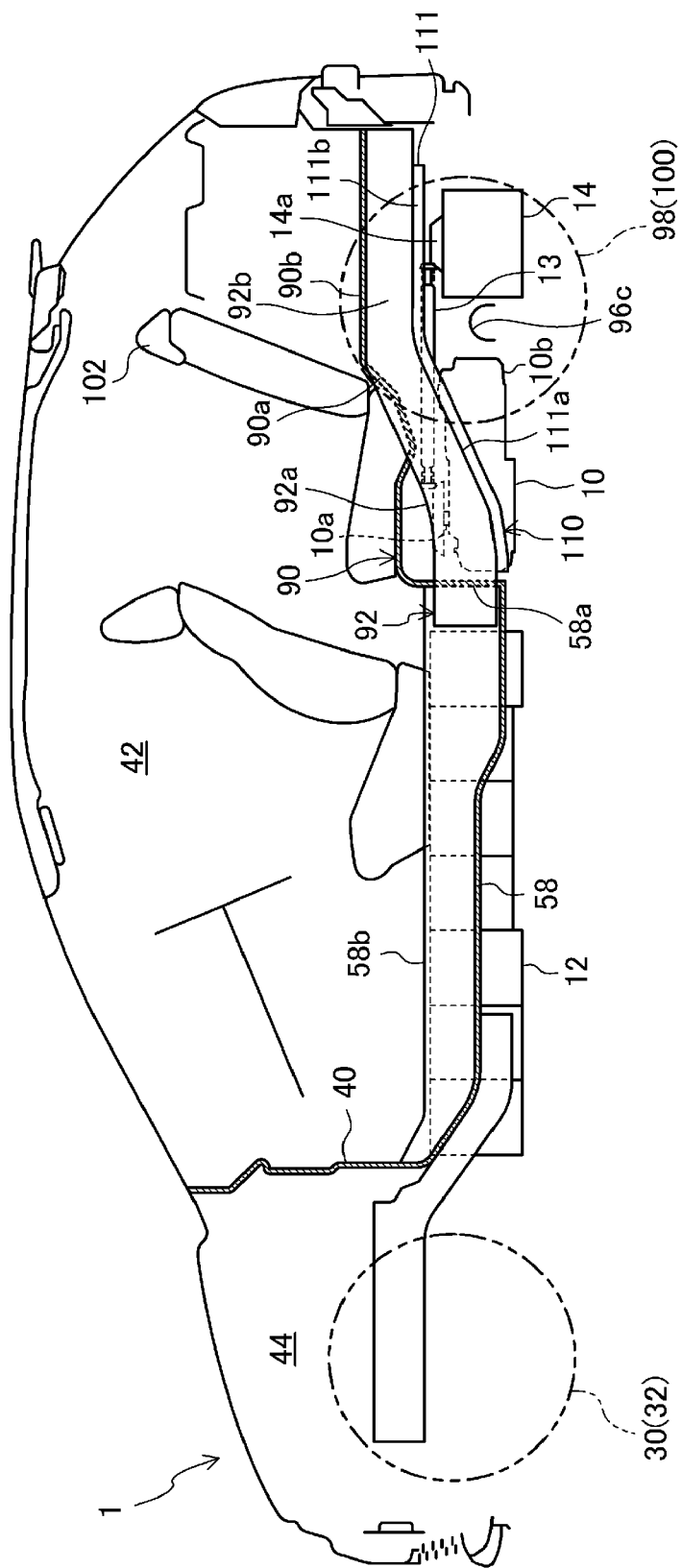
FIG. 7 is a schematic side view showing a whole structure of the electric vehicle according to a second embodiment.
Figure 8:
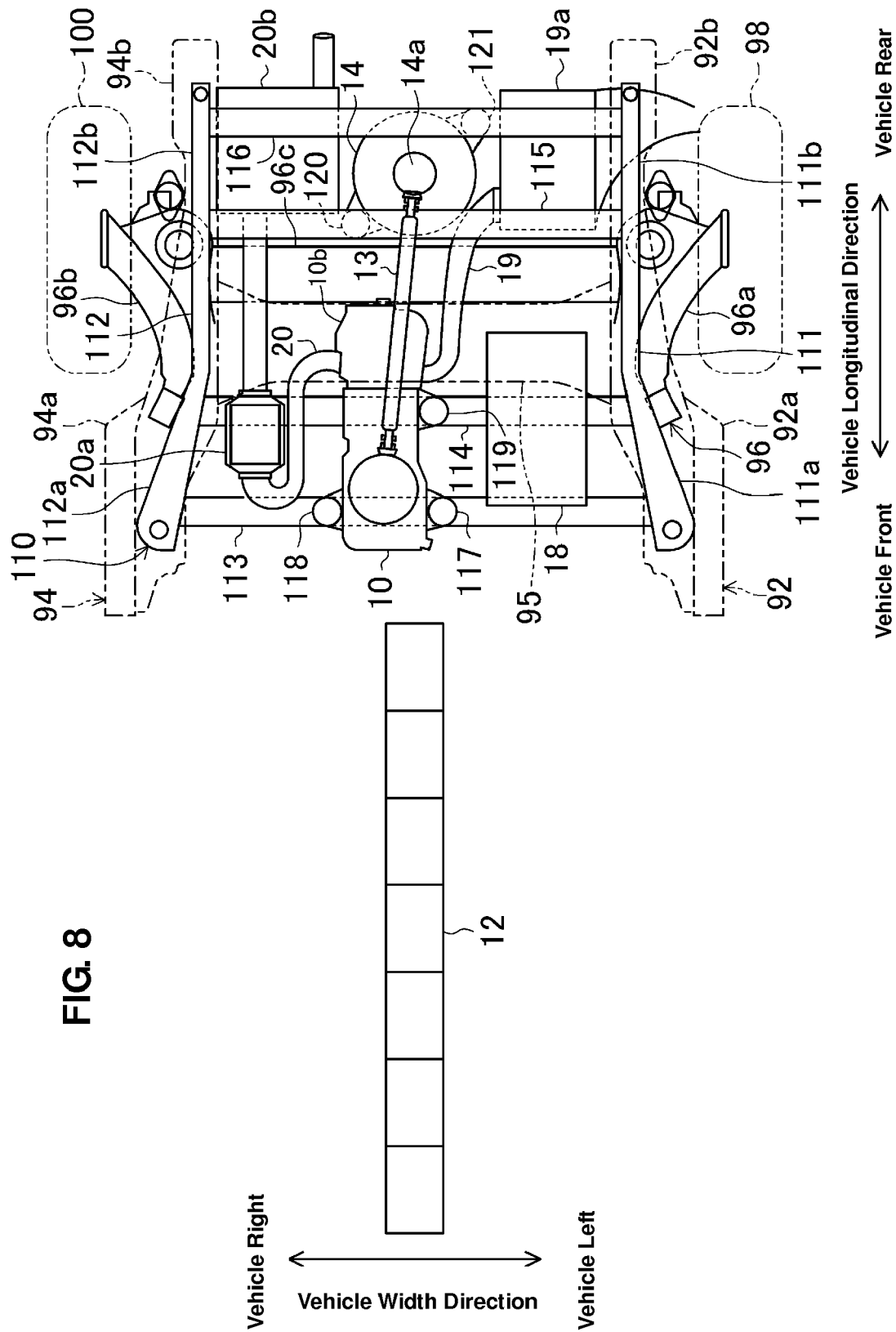
FIG. 8 is a schematic plan view showing a rear structure of the electric vehicle according to the second embodiment.
Figure 9:
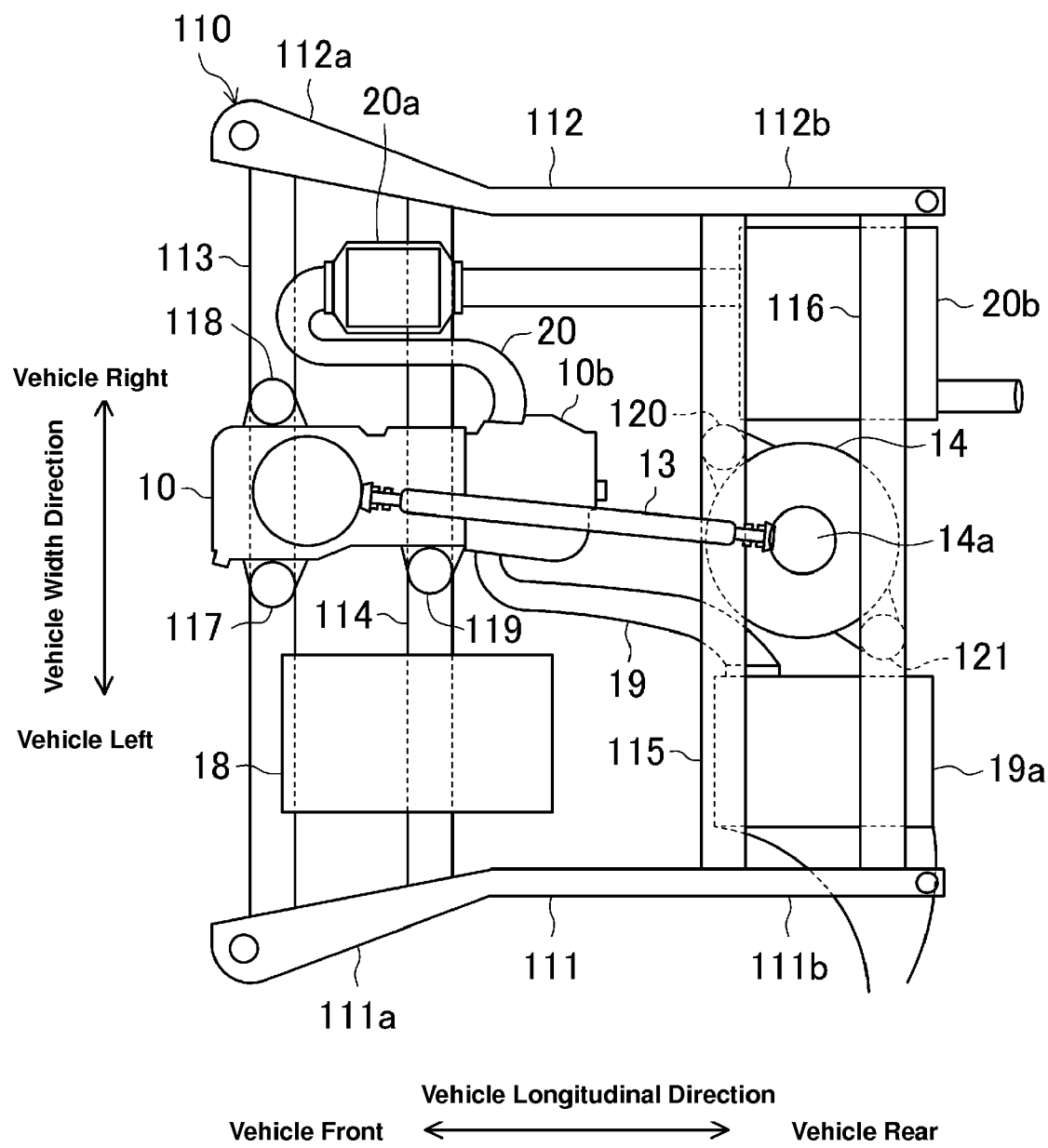
FIG. 9 is a schematic plan view showing an attachment of an internal combustion engine and a generator to a sub frame according to the second embodiment.
Figure 10:
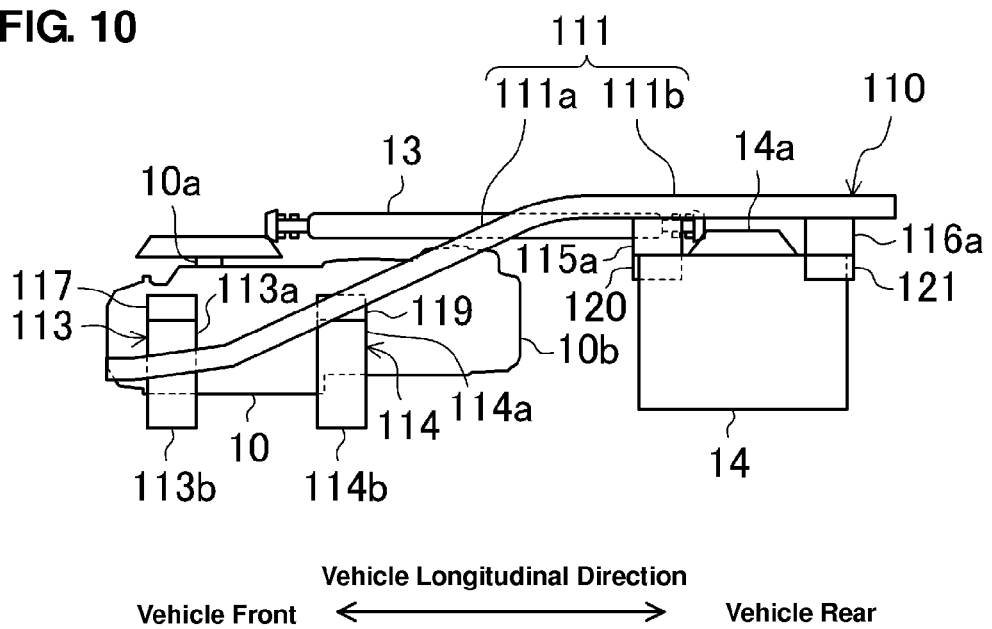
FIG. 10 is a schematic side view showing the attachment of the internal combustion engine and the generator to the sub frame according to the second embodiment.
Figure 11:
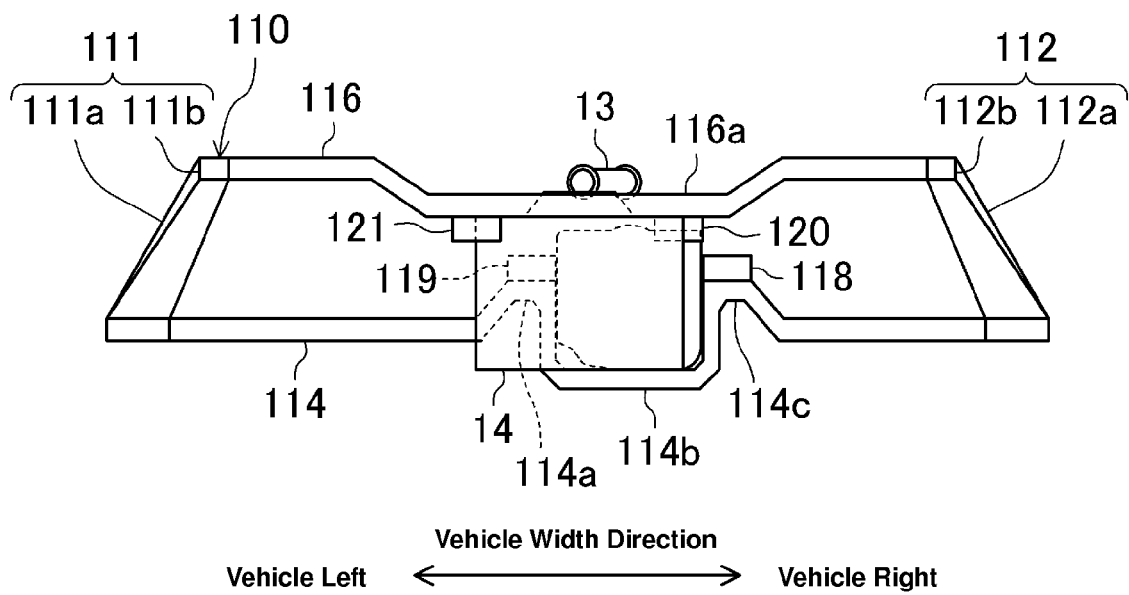
FIG. 11 is a schematic rear view showing the attachment of the internal combustion engine and the generator to the sub frame according to the second embodiment.

A second embodiment is different from the above-described first embodiment in the specific rear structure of the electric vehicle 1. Hereinafter, its different points will be described mainly. FIG. 7 is a schematic side view showing a whole structure of the electric vehicle. FIG. 8 is a schematic plan view showing the rear structure of the electric vehicle. FIG. 9 is a schematic plan view showing an attachment of the engine and the generator to the sub frame. FIG. 10 is a schematic side view showing the attachment of the engine and the generator to the sub frame. FIG. 11 is a schematic rear view showing the attachment of the engine and the generator to the sub frame. In these figures, illustrations of some components are omitted or simplified for an easy observation of the drawings.

The cross beam 96c is arranged in back of the rear cross member 95 below the central portion of the rear floor panel 90 (specifically, below the front end portion of the baggage-compartment floor 90b) at a position which is near the center of the rear wheels 98, 100 (specifically, slightly below and forward from the wheel's center).

The engine 10 is arranged in front of the cross beam 96c below the central portion of the rear floor panel 90 so that its crank shaft 10a extends in the vertical direction. Specifically, the engine 10 is disposed below the central portion of the front portion of the rear floor panel 90 so that its side of cylinder head 10b is directed to the rear of the vehicle and its intake side is directed to the left of the vehicle. The crank shaft 10a of the engine 10 is positioned at the front side of the engine 10.

The buttery 12 is arranged in a longitudinally entire area of the floor tunnel 58b.

The generator 14 is arranged in back of the cross beam 96c (i.e., in back of the engine 10) below the central portion of the rear floor panel 90 so that the rotational shaft 14a extends in the vertical direction. Specifically, the generator 14 is arranged in back of the engine 10 (specifically, slightly on the left and rear side of the engine 10) below a central portion of the baggage-compartment floor 90b. Thus, the engine 10 and the generator 14 are arranged side by side in the vehicle longitudinal direction. The generator 14 and the engine 10 are disposed so that the position of the rotational shaft 14a of the generator 14 aligns with the position of the crank shaft 10a of the engine 10 in the vehicle longitudinal direction in the plan view of the vehicle. The rotational shaft 14a is connected to the crank shaft 10a of the engine 10 via a bevel gear 13. This bevel gear 13 has a basic structure which is well known, so its detailed description is omitted here. The bevel gear 13 extends from a front upper portion of the engine 10 to an upper face of the generator 14, passing over the cross beam 96c and a second medium frame 115, without interfering with the rear floor panel 90. A reduction ratio of the bevel gear 13 (i.e., the reduction ratio from the engine 10 to the generator 14) is about one half, for example. The generator 14 is not integrally connected to the engine 10, but separately from the engine 10.

The fuel tank 18 is positioned on the left side of the engine 10 below a left portion of the rear floor panel 90. The intake passage 19 is disposed below the left portion of the rear floor panel 90 so as to extend from a left rear portion of the engine 10 to the left and rear of the vehicle. The air cleaner 19a is arranged in back of the cross beam 96c and on the left side of the generator 14 below the left portion of the rear floor panel 90. The exhaust passage 20 is disposed below a right portion of the rear floor panel 90 so as to extend from a right rear portion of the engine 10 to the vehicle right, and forwardly, and then curves rearwardly. Then, the exhaust passage 20 extends rearwardly, passing over the cross beam 96c. The above-described exhaust-gas purifying device 20a is positioned in front of the cross beam 96c and on the right side of the engine 10 below the right portion of the rear floor panel 90. The muffler 20b is arranged in back of the cross beam 96c and on the right side of the generator 14 below the right portion of the rear floor panel 90.

The engine 10, generator 14, fuel tank 18, air cleaner 19a, exhaust-gas purifying device 20a and muffler 20b are disposed between the pair of rear side frames 92, 94. The engine 10, generator 14, and fuel tank 18 are attached to a sub frame 110. Hereinafter, the attachment of these will be described.

The sub frame 110 comprises left and right side frames 111, 112 which extend in the vehicle longitudinal direction, a front frame 113 (cross member) which extends in the vehicle width direction and connects to front end portions of the side frames 111, 112, a first medium frame 114 (cross member) which extends in parallel to and in back of the front frame 113 and connects to the side frames 111, 112, a second medium frame 115 (cross member) which extends in parallel to and in back of the first medium frame 114 and connects to the side frames 111, 112, and a rear frame 116 (cross member) which extends in parallel to the second medium frame 115 and connects to respective rear end portions of the side frames 111, 112.

The side frames 111, 112 comprise slant portions 111a, 112a which extend obliquely, rearwardly and upwardly, so as to correspond to the slant portions 92a, 94a of the rear side frames 92, 94, and horizontal portions 111b, 112b which extend horizontally rearwardly from rear ends of the slant portions 111a, 112a so as to correspond to the horizontal portions 92b, 94b of the rear side frames 92, 94. The slant portions 111a, 112a expand outwardly in the vehicle forward direction so as to correspond to the slant portions 92a, 94a of the rear side frames 92, 94.

At a central portion of the front frame 113 (specifically, slightly on the right side of the vehicle) is formed a first projecting portion 113a which projects upwardly, a concave portion 113b which is formed on the right side of the first projecting portion 113a so as to be concaved downwardly, and a second projecting portion (without its reference character) which is formed on the right side of the concave portion 113b so as to project upwardly.

The first medium frame 114 is arranged in front of the cross beam 96c, and connects to respective central portions of the slant portions 111a, 112a of the side frames 111, 112. A height of the first medium frame 114a is substantially the same as that of the front frame 113. A first projecting portion 114a which projects upwardly is formed at a specified portion of a central portion of the first medium frame 114 which corresponds to the first projecting portion 113a of the front frame 113. A height of an upper face portion of the first projecting portion 114a is substantially the same as that of an upper face portion of the first projecting portion 113a of the front frame 113. A concave portion 114b which is formed so as to be concaved downwardly is formed at a specified portion of the central portion of the first medium frame 114 which corresponds to the concave portion 113b of the front frame 113. A height of a bottom portion of the concave portion 114b is substantially the same as that of a bottom portion of the concave portion 113b of the front frame 113. A second projecting portion 114c which projects upwardly is formed at a specified portion of the central portion of the first medium frame 114 which corresponds to the second projecting portion of the front frame 113. A height of an upper face portion of the second projecting portion 114c is substantially the same as that of an upper face portion of the second projecting portion of the front frame 113.

The engine 10 is resiliently mounted, in a state in which it is disposed in the concave portions 113b, 114b of the front frame 113 and the first medium frame 114, on the upper face of the first projecting portion 113a of the front frame 113 via a mount 117 which is provided at a left face of a front upper portion of the engine 10, on the upper face of the second projecting portion of the front frame 113 via a mount 118 which is provided at a right face of the front upper portion of the engine 10, and on the upper face of the first projecting portion 114a of the first medium frame 114 via a mount 119 which is provided at a left face of a middle upper portion of the engine 10. A basic structure of these mounts 117-119 is well known, so its detailed description is omitted here.

The fuel tank 18 is supported between an upper face of a right portion of the front frame 113 and an upper face of a left portion of the first medium frame 114.

The second medium frame 115 is disposed in back of the cross beam 96c and connects respective front end portions of the horizontal portions 71b, 72b of the side frames 111, 112. The second medium frame 115 has a concave portion 115a which is concaved downwardly at its central portion. The rear frame 116 is positioned substantially at the same level (height) as the second medium frame 115. The rear frame 116 also has a concave portion 116a which is concaved downwardly at its central portion so as to correspond to the concave portion 115a of the second medium frame 115. This concave portion 116a is positioned substantially at the same level (height) as the concave portion 115a of the second medium frame 115.

The generator 14 is resiliently mounted on a lower face of the concave portion 115a of the second medium frame 115 via a mount 120 which is provided on a front right side of an upper portion of the generator 14, and mounted on a lower face of the concave portion 116a of the rear frame 116 via a mount 121 which is provided on a rear left side of the upper portion of the generator 14. A basic structure of these mounts 120-121 is well known, so its detailed description is omitted here.

Herein, the air cleaner 19a is arranged below the left portion of the second medium frame 115 and the left portion of the rear frame 116. The exhaust-gas purifying device 20a is arranged below the right portion of the first medium frame 114. The muffler 20b is disposed below the right portion of the second medium frame 115 and the right portion of the rear frame 116. The sub frame 110 to which the engine 10, generator 14 and fuel tank 18 are attached is attached to lower faces of the rear side frames 92, 94 at the side frames 111, 112. As described above, the engine 10, the generator 14 and others are supported at the vehicle body. Herein, the motor 16, inverter 22 and others are arranged in the above-described vehicle front space 44 (not illustrated in FIG. 7). The other structures are almost the same as the first embodiment.

—Effects—

As described above, according to the present embodiment, the engine 10 and the generator 14 are arranged side by side in the vehicle longitudinal direction, so that the arrangement space for the bevel gear 13 can be ensured. Since the drive shaft 10a of the engine 10 and the rotational shaft 14a of the generator 14 are connected via the bevel gear 13, the layout flexibility of the engine 10 and the generator 14 can be improved, and the rotational speed of the engine 10 and the generator 14 can be adjusted properly.

Further, since the engine 10 is the reciprocating engine and arranged at the central portion in the vehicle width direction below the rear floor panel 90 so that its cylinder head 10b is directed rearwardly, spaces on both sides of the engine 10 in the vehicle width direction can be used effectively. Moreover, since the buttery 12 is arranged inside the floor tunnel 58b, and the fuel tank 18 is arranged on the left side of the engine 10 below the rear floor panel 90, there is no need of providing any arrangement space for the buttery 12 at the front portion or the rear portion of the vehicle, so that the longitudinal length of the vehicle can be shorter.

The present embodiment performs similar effects to the first embodiment in terms of the others. Herein, while the drive shaft 10a of the engine 10 and the rotational shaft 14a of the generator 14 are connected via the gear 13 in the present embodiment, they may be connected by a chain instead.

Embodiment 3

Figure 12:
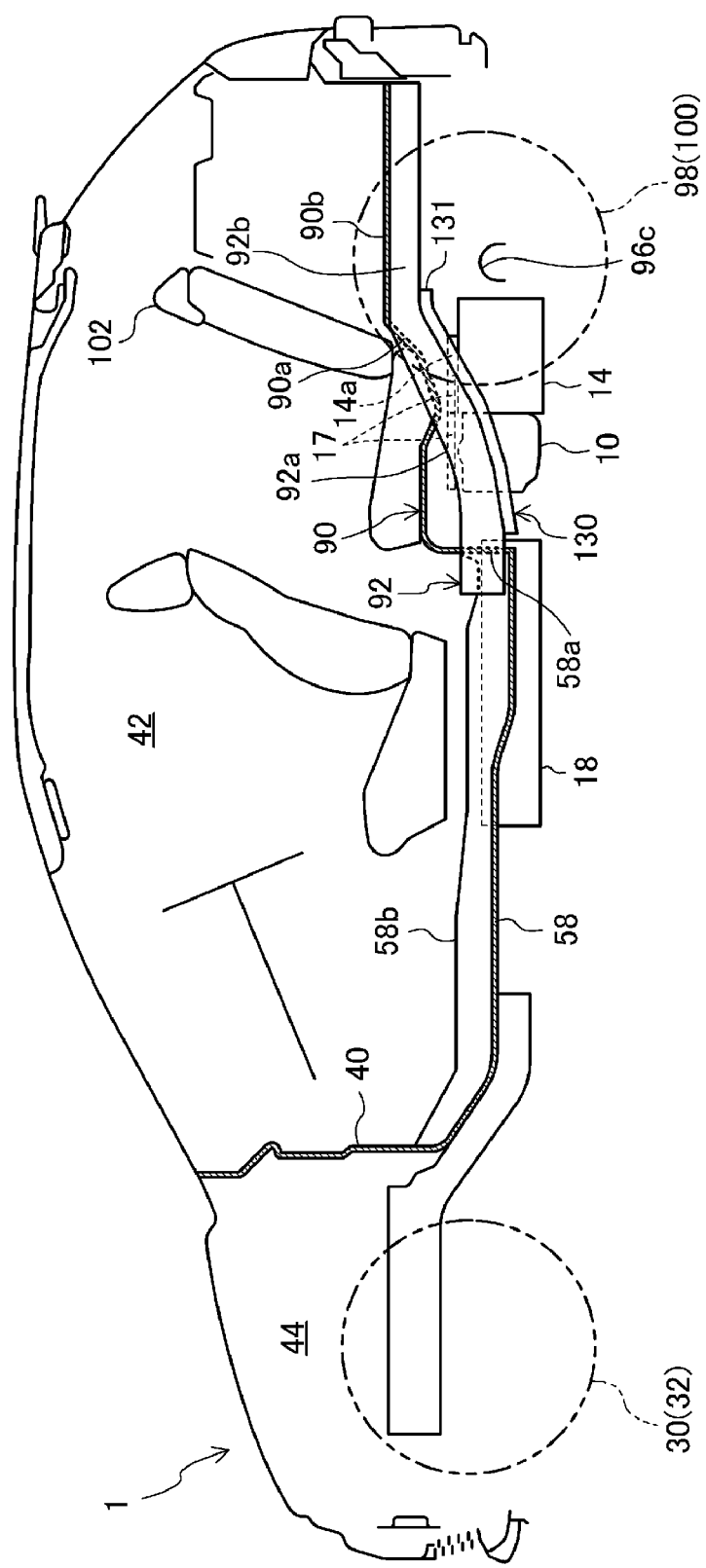
FIG. 12 is a schematic side view showing a whole structure of the electric vehicle according to a third embodiment.
Figure 13:
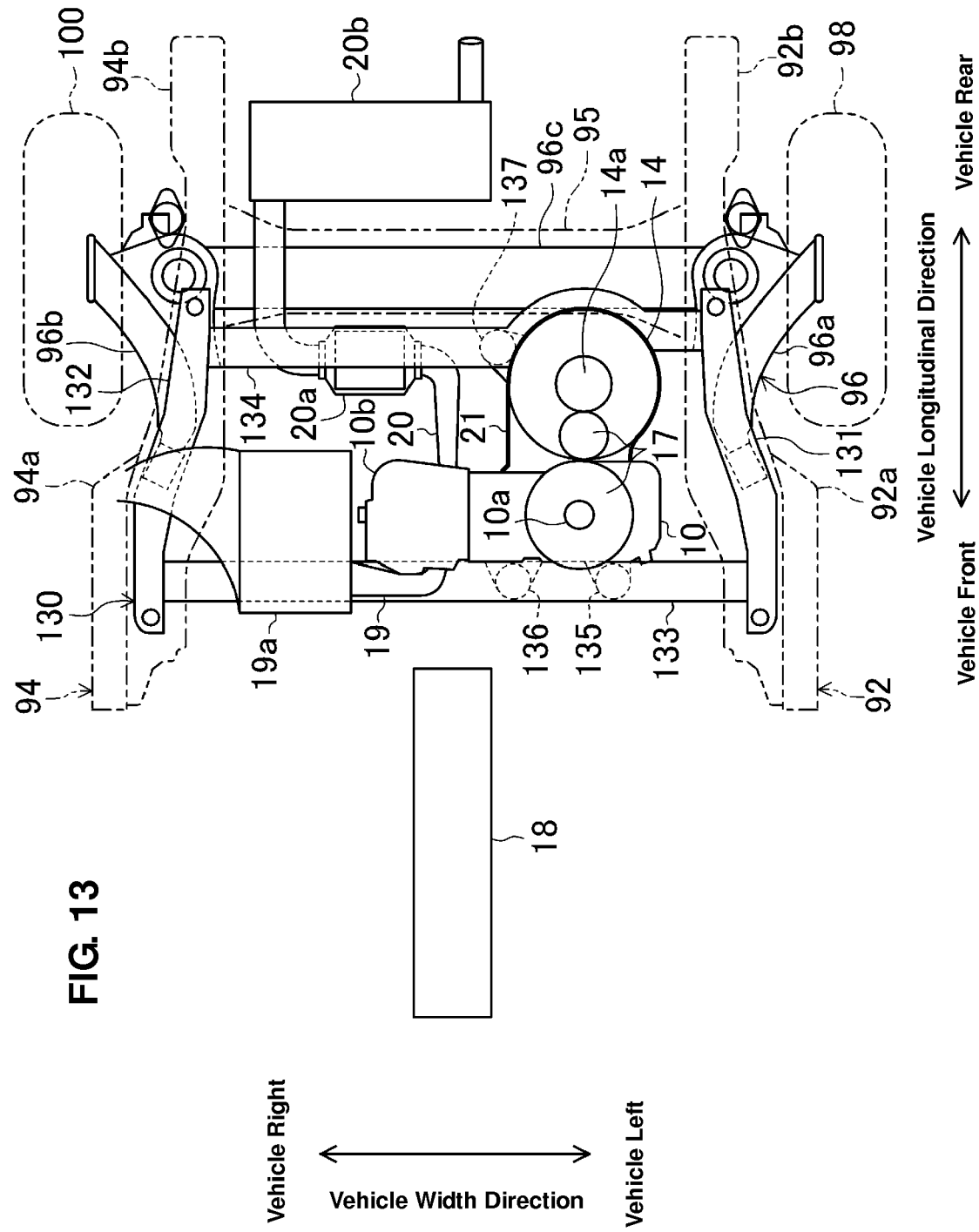
FIG. 13 is a schematic plan view showing a rear structure of the electric vehicle according to the third embodiment.
Figure 14:
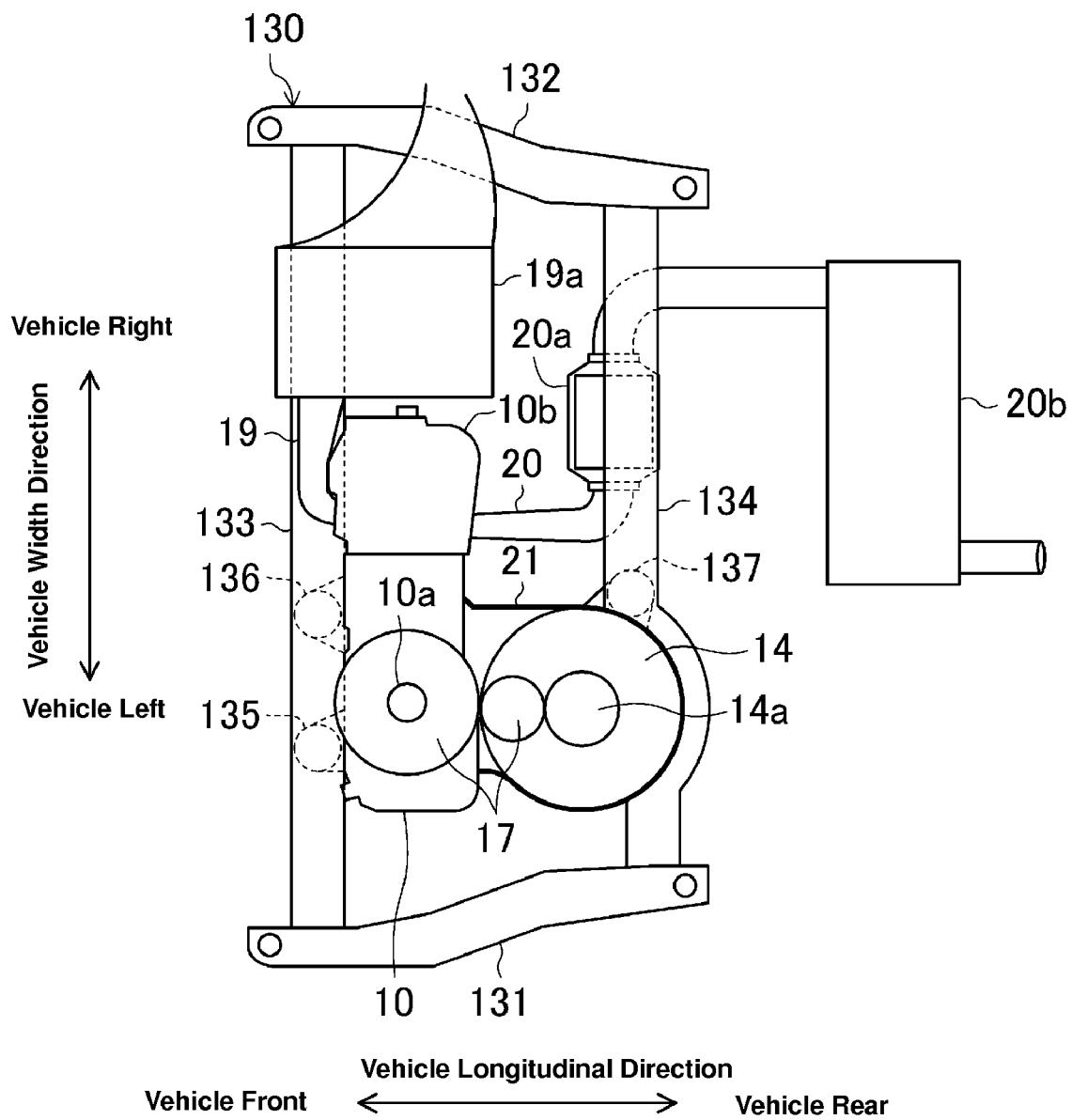
FIG. 14 is a schematic plan view showing an attachment of an internal combustion engine and a generator to a sub frame according to the third embodiment.
Figure 15:
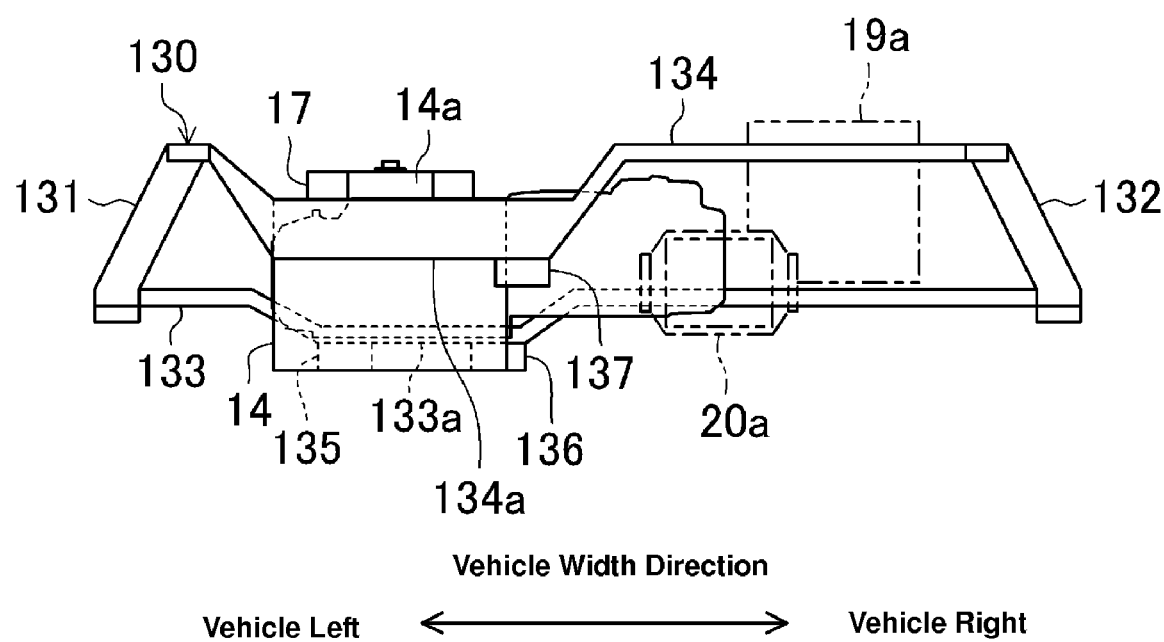
FIG. 15 is a schematic rear view showing the attachment of the internal combustion engine and the generator to the sub frame according to the third embodiment.

A third embodiment is different from the above-described first embodiment in the specific rear structure of the electric vehicle 1. Hereinafter, its different points will be described mainly. FIG. 12 is a schematic side view showing a whole structure of the electric vehicle. FIG. 13 is a schematic plan view showing the rear structure of the electric vehicle. FIG. 14 is a schematic plan view showing an attachment of the engine and the generator to the sub frame. FIG. 15 is a schematic rear view showing the attachment of the engine and the generator to the sub frame. In these figures, illustrations of some components are omitted or simplified for an easy observation of the drawings.

The cross beam 96c is arranged below the central portion of the rear floor panel 90 (specifically, below the front end portion of the baggage-compartment floor 90b) and the rear cross member 95 at a position which is near the center of the rear wheels 98, 100 (specifically, slightly below the wheel's center).

The engine 10 is arranged in front of the cross beam 96c below the central portion of the rear floor panel 90 so that its crank shaft 10a extends in the vertical direction. Specifically, the engine 10 is disposed below the front portion of the rear floor panel 90 slightly on the left side of the vehicle so that its side of cylinder head 10b is directed to the right of the vehicle and its intake side is directed to the front of the vehicle. The crank shaft 10a of the engine 10 is positioned at a left side of the engine 10.

The generator 14 is arranged in front of the cross beam 96c below the left portion of the rear floor panel 90 so that the rotational shaft 14a extends in the vertical direction. Specifically, the generator 14 is arranged below the front portion of the rear floor panel 90 right behind the engine 10. Thus, the engine 10 and the generator 14 are arranged side by side in the vehicle longitudinal direction. The generator 14 and the engine 10 are disposed so that the position of the rotational shaft 14a of the generator 14 aligns with the position of the crank shaft 10a of the engine 10 in the vehicle longitudinal direction in the plan view of the vehicle. The rotational shaft 14a is connected to the crank shaft 10a of the engine 10 via a gear 17. This gear 17 is arranged so as not to interfere with the rear floor panel 90. A reduction ratio of the gear 17 (i.e., the reduction ratio from the engine 10 to the generator 14) is about one half, for example. The generator 14 is arranged below the rear seat 102 provided on the rear floor panel 90 along with the engine 10. The generator 14 is integrally connected to a left rear-side face of the engine 10 via a connecting member 21, and preferably the generator 14 and the engine 10 are integrally stored in a casing as the connecting member 21.

The intake passage 19 is disposed below the right portion of the rear floor panel 90 so as to extend from a right front portion of the engine 10 to the right of the vehicle. The air cleaner 19a is arranged in front of the cross beam 96c and on the right side of the engine 10 below the right portion of the rear floor panel 90. The exhaust passage 20 is disposed below the right portion of the rear floor panel 90 so as to extend from a right rear portion of the engine 10 to the rear of the vehicle, and to the right of the vehicle, and then rearwardly, passing over the cross beam 96c. Then, the exhaust passage 20 extends to the left and then rearwardly. The above-described exhaust-gas purifying device 20a is positioned in front of the cross beam 96c and on the right side of the generator 14 below the right portion of the rear floor panel 90. The muffler 20b is arranged in back of the cross beam 96c and on the rear side of the exhaust-gas purifying device 20a below the right portion of the rear floor panel 90.

The engine 10, generator 14, air cleaner 19a, exhaust-gas purifying device 20a and muffler 20b are disposed between the pair of rear side frames 92, 94. The engine 10 and the generator 14 are attached to a rectangular frame-shaped sub frame 130. Hereinafter, the attachment of these will be described.

The sub frame 130 comprises left and right side frames 131, 132 which extend in the vehicle longitudinal direction, a front frame 133 (cross member) which extends in the vehicle width direction and connects to front end portions of the side frames 131, 132, and a rear frame 134 (cross member) which extends in parallel to the front frame 133 and connects to respective rear end portions of the side frames 131, 132. The side frames 131, 132 extend obliquely, rearwardly and upwardly, so as to correspond to the slant portions 92a, 94a of the rear side frames 92, 94. At a left portion of the front frame 133 is formed a concave portion 133a which is concaved downwardly. A position of the rear frame 134 is higher than that of the front frame 133. At a left portion of the rear frame 134 which corresponds to the concave portion 133a of the front frame 133 is formed a concave portion 134a which is concaved downwardly. This concave portion 134a curves rearwardly in the plan view so as to correspond to the generator 14. A position of a bottom portion of the concave portion 134a is higher than that of the concave portion 133a of the front frame 133.

The engine 10 and the generator 14 which are connected are resiliently mounted on a lower face of the concave portion 133a of the front frame 113 via mounts 135, 136 which are provided at a front face of a left lower portion of the engine 10, and on a lower face of the concave portion 134a of the rear frame 134 via a mount 137 which is provided at a right rear portion of an upper portion of the generator 14. A basic structure of these mounts 135-137 is well known, so its detailed description is omitted here.

Herein, the air cleaner 19a is arranged above the right portion of the front frame 133. The exhaust-gas purifying device 20a is arranged below the right portion of the first medium frame 114. The muffler 20b is disposed below the right portion of the rear frame 134. The sub frame 130 to which the engine 10 and the generator 14 are attached is attached to lower faces of the slant portions 92a, 94a of the rear side frames 92, 94 at the side frames 131, 132. As described above, the engine 10, the generator 14 and others are supported at the vehicle body. Herein, the buttery 12, motor 16, inverter 22 and others are arranged in the above-described vehicle front space 44 (not illustrated in FIG. 12). The other structures are almost the same as the first embodiment.

—Effects—

As described above, according to the present embodiment, the engine 10 and the generator 14 are arranged side by side in the vehicle longitudinal direction, so that the arrangement space for the gear 17 can be ensured. Since the crank shaft 10a of the engine 10 and the rotational shaft 14a of the generator 14 are connected via the gear 17, the layout flexibility of the engine 10 and the generator 14 can be improved, and the rotational speed of the engine 10 and the generator 14 can be adjusted properly.

Further, since both the engine 10 and the generator 14 are arranged in front of the cross beam 96, since both the engine 10 and the generator 14 which have the relatively heavy weight are positioned as forward of the vehicle as possible, the yaw inertia moment can be further decreased.

The present embodiment performs similar effects to the first embodiment in terms of the others. Herein, while the crank shaft 10a of the engine 10 and the rotational shaft 14a of the generator 14 are connected via the gear 17 in the present embodiment, they may be connected by a chain instead. Further, the engine 10 and the generator 14 may be formed separately instead of the above-described structure in which they are formed integrally in the present embodiment.

Embodiment 4

Figure 16:
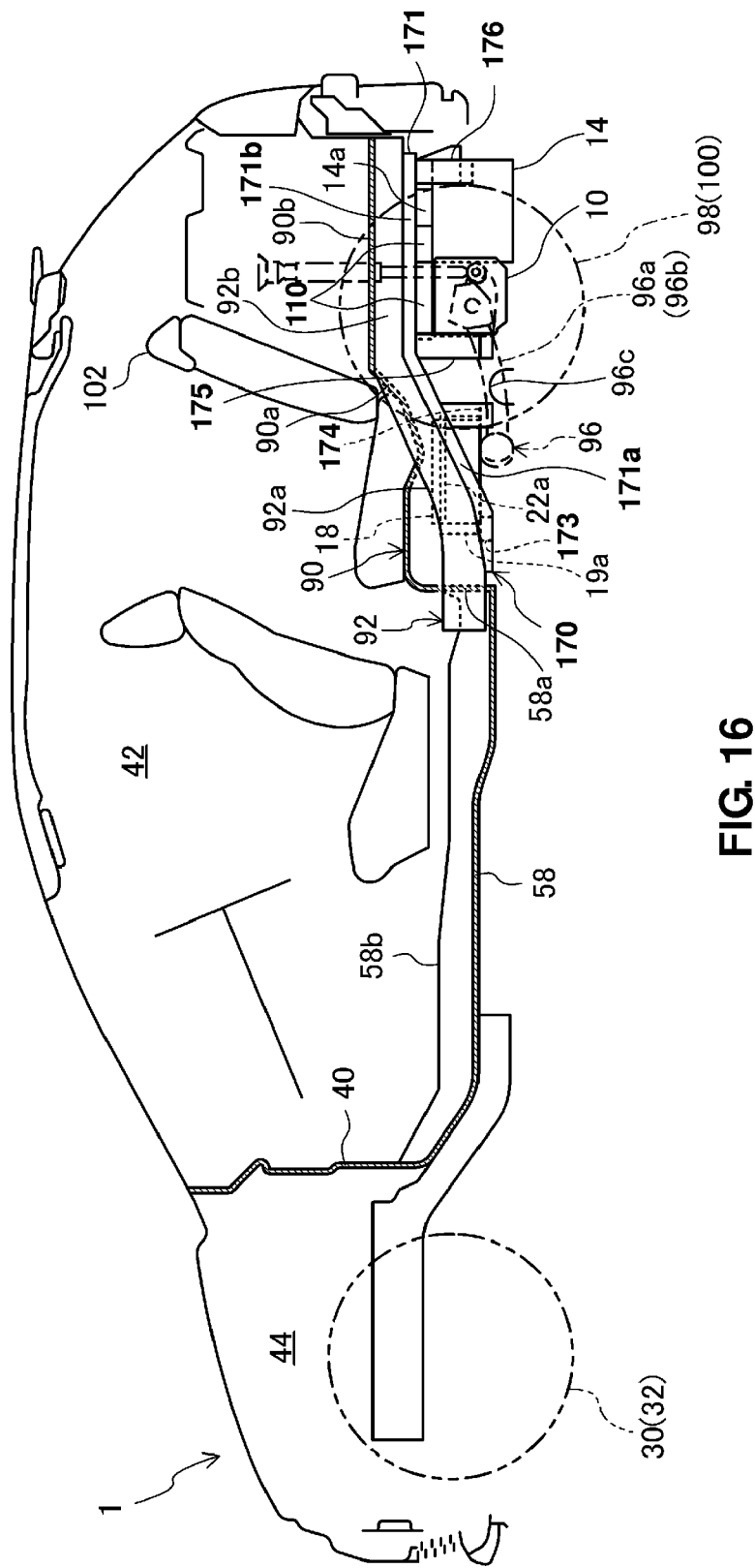
FIG. 16 is a schematic side view showing a whole structure of the electric vehicle according to a fourth embodiment.
Figure 17:
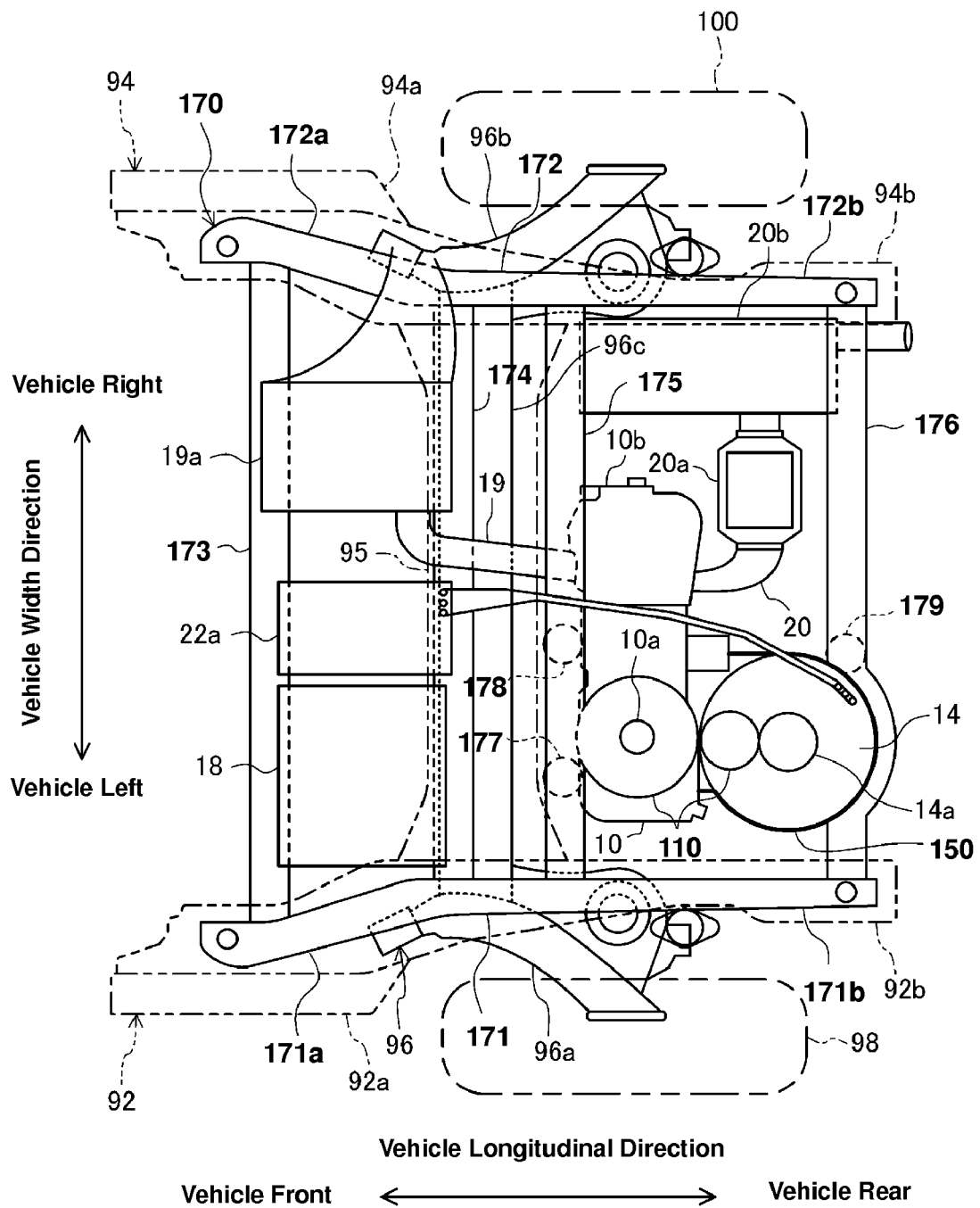
FIG. 17 is a schematic plan view showing a rear structure of the electric vehicle according to the fourth embodiment.
Figure 18:
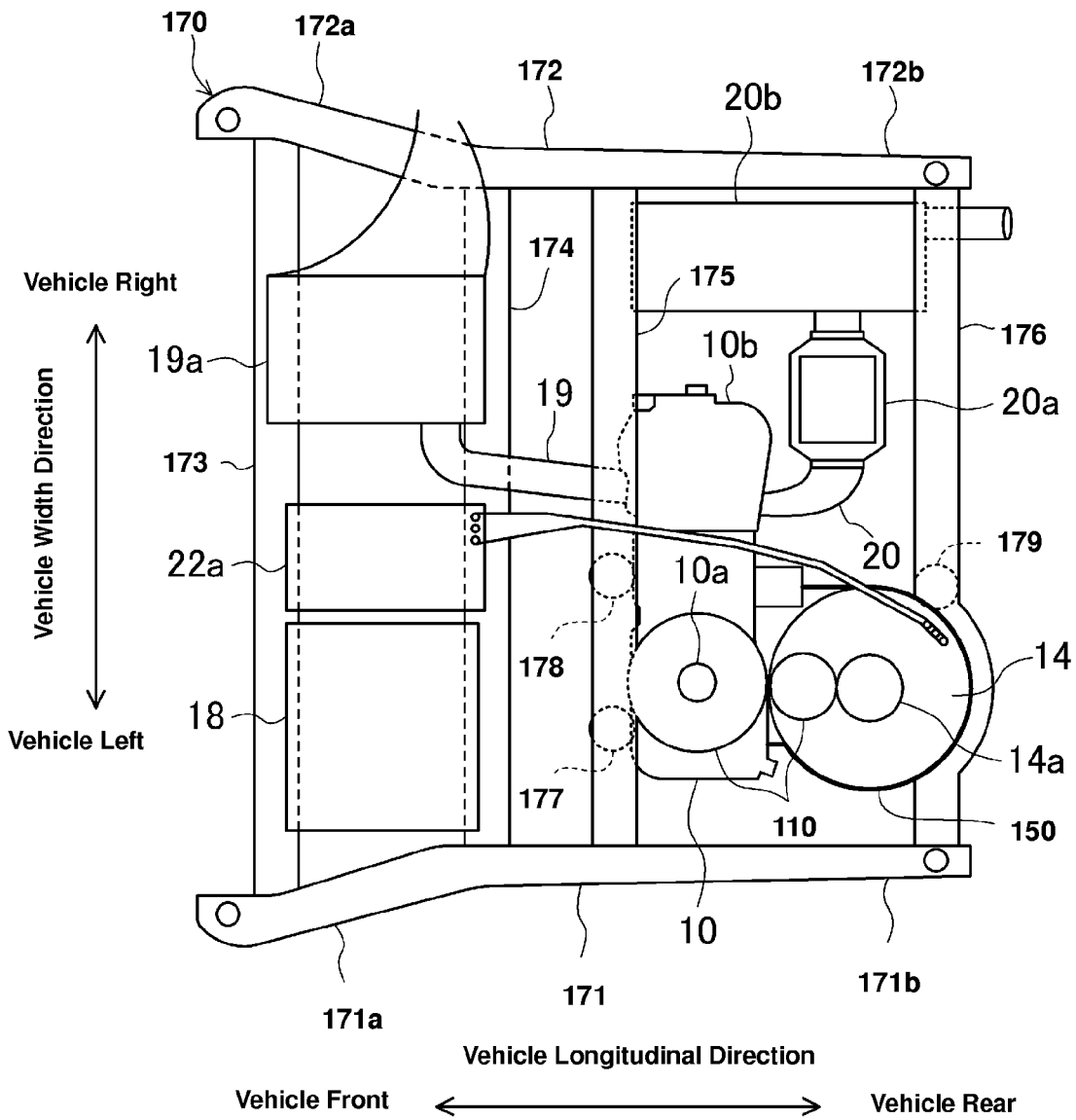
FIG. 18 is a schematic plan view showing an attachment of an internal combustion engine and a generator to a sub frame according to the fourth embodiment.

A fourth embodiment is different from the above-described first embodiment in the specific rear structure of the electric vehicle 1. Hereinafter, its different points will be described mainly. FIG. 16 is a schematic side view showing a whole structure of the electric vehicle. FIG. 17 is a schematic plan view showing a rear structure of the electric vehicle. FIG. 18 is a schematic plan view showing an attachment of the engine, generator, fuel tank, air cleaner, and AC-DC converter to the sub frame. FIG. 19 is a schematic side view showing the attachment of the engine, generator, fuel tank, air cleaner, and AC-DC converter to the sub frame. FIG. 20 is a schematic rear view showing the attachment of the engine and generator to the sub frame. In these figures, illustrations of some components are omitted or simplified for an easy observation of the drawings.

The engine 10 is arranged in back of the cross beam 96c below the central portion of the rear floor panel 90 (i.e., below the central portion of the baggage-compartment floor 90b) so that its crank shaft 10a extends in the vertical direction. Specifically, the engine 10 is disposed below the front portion of the baggage-compartment floor 90b slightly on the left side of the vehicle so that its side of cylinder head 10b is directed to the right of the vehicle and its intake side is directed to the front of the vehicle. The crank shaft 10a of the engine 10 is positioned at a left side of the engine 10.

The generator 14 is arranged in back of the cross beam 96c below the left portion of the rear floor panel 90 so that the rotational shaft 14a extends in the vertical direction. Specifically, the generator 14 is arranged right behind the engine 10 so that the position of the rotational shaft 14a of the generator 14 aligns with the position of the crank shaft 10a of the engine 10 in the vehicle longitudinal direction in the plan view of the vehicle. Thus, the engine 10 and the generator 14 are arranged side by side in the vehicle longitudinal direction. The rotational shaft 14a is connected to the crank shaft 10a of the engine 10 via a gear 110. A reduction ratio of the gear 11 (i.e., the reduction ratio from the engine 10 to the generator 14) is about one half, for example. A rotational speed of the engine 10 is about 2000 rpm, for example. Thus, a rotational speed of the generator 14 is about 4000 to 5000 rpm. A height of an upper face of the generator 14 is substantially the same as that of an upper face of the engine 10. The generator 14 is integrally connected to a left rear-side face of the engine 10 via a connecting member 150, and preferably the generator 14 and the engine 10 are integrally stored in a casing as the connecting member 150.

Herein, the engine 10 and the generator 14 are arranged so as to prevent any interference with the cross beam 96c moving vertically and ensure a necessary height from the ground. While the engine 10 and the generator 14 are arranged so that both the crank shaft 10a and the rotational shaft 14a extend in the vertical direction in the present embodiment, the arrangement of the engine 10 and the generator 14 may be set so that respective axes of the shafts 10a, 14a are positioned so as to be slant forwardly relative to the vertical direction.

The intake passage 19 is disposed below the right portion of the rear floor panel 90 so as to extend from a right front portion of the engine 10 to the front of the vehicle, passing over the cross beam 96c, and then to the right of the vehicle. The air cleaner 19a is arranged in front of the cross beam 96c below the right portion of the rear floor panel 90. Thus, the air cleaner 19a constitutes a front part of the intake system of the engine 10 which is positioned in front of the cross beam 96c.

The exhaust passage 20 is disposed in back of the cross beam 96c below the right portion of the rear floor panel 90 so as to extend from a right rear portion of the engine 10 to the right of the vehicle, and then rearwardly. The above-described exhaust-gas purifying device 20a is arranged in back of the right portion of the engine 10 below the right portion of the rear floor panel 90. The muffler 20b is arranged on the right side of the exhaust-gas purifying device 20a below the right portion of the rear floor panel 90.

The fuel tank 18, air cleaner 19a and AC-DC converter 22a are arranged in line in the vehicle width direction at a position which is in front of the cross beam 96c below the front portion of the rear floor panel 90. Specifically, fuel tank 18, AC-DC converter 22a and air cleaner 19a are arranged in order from the left of the vehicle. The AC-DC converter 22a is disposed below the central portion of the rear floor panel 90. The fuel tank 18, air cleaner 19a and AC-DC converter 22a are arranged below the rear seat 102 provided on the rear floor panel 90. The engine 10, generator 14, fuel tank 18, air cleaner 19a, exhaust-gas purifying device 20a, muffler 20b, and AC-DC converter 22a are disposed between the pair of rear side frames 92, 94. Thus, some large-sized components other than the engine 10 and the generator 14, such as the fuel tank 18, air cleaner 19a, and AC-DC converter 22a, are arranged outside the floor tunnel 58 as well as the engine 10 and the generator 14.

The engine 10, generator 14, fuel tank 18, air cleaner 19a, and AC-DC converter 22a are attached to a rectangular frame-shaped sub frame 170. Hereinafter, the attachment of these will be described.

The sub frame 170 suppresses transmission of vibrations of the engine 10, and is arranged below the rear side frames 92, 94. The sub frame 170 comprises left and right side frames 171, 172 which extend in the vehicle longitudinal direction, a front frame 173 which extends in the vehicle width direction and connects to front end portions of the side frames 171, 172, a first medium frame 174 which extends in parallel to and in back of the front frame 173 and connects to the side frames 171, 172, a second medium frame 175 which extends in parallel to and in back of the first medium frame 174 and connects to the side frames 171, 172, and a rear frame 176 which extends in parallel to the second medium frame 175 and connects to respective rear end portions of the side frames 171, 172.

The side frames 171, 172 comprise slant portions 171a, 172a which extend obliquely, rearwardly and upwardly, so as to correspond to the slant portions 92a, 94a of the rear side frames 92, 94, and horizontal portions 171b, 172b which extend horizontally rearwardly from rear ends of the slant portions 171a, 172a so as to correspond to the horizontal portions 92b, 94b of the rear side frames 92, 94. The slant portions 171a, 172a expand outwardly in the vehicle forward direction so as to correspond to the slant portions 92a, 94a of the rear side frames 92, 94. The first medium frame 174 is arranged substantially at the same position as the cross beam 96c in the longitudinal direction, and connects to respective central portions of the slant portions 171a, 172a of the side frames 111, 112. A height of the first medium frame 174 is substantially the same as that of the front frame 173. The fuel tank 18, air cleaner 19a, and AC-DC converter 22a are supported on an upper face of the front frame 173 and an upper face of the first medium frame 174.

The second medium frame 175 is disposed in back of the cross beam 96c and connects respective front end portions of the horizontal portions 71b, 72b of the side frames 171, 172. The second medium frame 175 comprises a first horizontal portion 175a which extends horizontally from the left-side side frame 171 to the right of the vehicle, a first slant portion 175b which extends obliquely downwardly and to the right of the vehicle from a right end of the first horizontal portion 175a, a second horizontal portion 175c which extends horizontally from a right (lower) end of the first slant portion 175b to the right of the vehicle, a second slant portion 175d which extends obliquely upwardly and to the right of the vehicle from a right end of the second horizontal portion 175c, and a third horizontal portion 175e which extends horizontally to the right of the vehicle from a right (upper) end of the second slant portion 175d. The second horizontal portion 175c is arranged on the left side of the vehicle.

The rear frame 176 comprises a first horizontal portion 176a which extends horizontally from the left-side side frame 171 to the right of the vehicle, a first slant portion 176b which extends obliquely downwardly and to the right of the vehicle from a right end of the first horizontal portion 176a, a second horizontal portion 175c which extends horizontally from a right (lower) end of the first slant portion 176b to the right of the vehicle, a second slant portion 176d which extends obliquely upwardly and to the right of the vehicle from a right end of the second horizontal portion 176c, and a third horizontal portion 175e which extends horizontally to the right of the vehicle from a right (upper) end of the second slant portion 176d. The second horizontal portion 176c is arranged on the right side of the second horizontal portion 175c. A height position of the second horizontal portion 176c is higher than the second horizontal portion 175c. A left portion of the rear frame 176 curves rearwardly so as to correspond to the generator 14 in the plan view.

An integrated unit comprising the engine 10 and the generator 14 is resiliently mounted on the lower face of the second horizontal portion 175c of the second medium frame 175 via mounts 177, 178 which are provided at the front face of the lower left portion of the engine 10, and mounted on the lower face of the second horizontal portion 176c of the rear frame 176 via a mount 179 which is provided at a right rear portion of a lower portion of the generator 14. A basic structure of these mounts 177-179 is well known, so its detailed description is omitted here.

Herein, the above-described muffler 20b is arranged below the third horizontal portion 175e of the second medium portion 175 and the third horizontal portion 176e of the rear frame 176.

Further, the sub frame 170 to which the engine 10, generator 14, fuel tank 18, air cleaner 19a, and AC-DC converter 22a are attached is attached to the lower faces of the rear side frames 92, 94 at the side frames 171, 172. That is, after the engine 10, generator 14, fuel tank, air cleaner 19a, and AC-DC converter 22a are attached to the sub frame 170, this sub frame 170 is attached to the rear side frames 92, 94.

As described above, the engine 10, the generator 14 and others are supported at the vehicle body.

—Effects—

As described above, according to the present embodiment, since the engine 10 and the generator 14 are arranged in back of the cross beam 96c below the rear floor panel 90, the space in front of the cross beam 96c can be used effectively. Further, the intake passage 19 of the engine 10 is arranged below the rear floor panel 90 so as to extend forwardly from the engine 10, passing over the cross beam 96c, the air intake into the engine 10 can be easily conducted. And, since the exhaust passage 19 of the engine 10 is arranged in back of the cross beam 96c below the rear floor panel 90 so as to extend rearwardly, the combusted-gas exhaustion rearwardly from the engine 10 can be easily conducted. Moreover, since the large-sized components, such as the fuel tank 18, air cleaner 19a, and AC-DC converter 22a, than the engine 10 and generator 14 are arranged outside the floor tunnel 58b, the floor tunnel 58b can be made properly low and flat.

The present should not be limited to the above-described embodiments, and any other modifications or improvements can be applied within the scope of a sprit of the present invention.

For example, while the torsion beam type of suspension 96 is applied for the rear wheels 98, 100 in the above-described embodiments, a rigid axel rear suspension which supports an axel of the rear wheels 98, 100 at the vehicle body via springs may be applied (especially for the first and second embodiments). Herein, the axel is positioned at the center of the rear wheels 98, 100 and constitutes the lateral connecting member which extends in the vehicle width direction and connects to supporting portions of the rear wheels 98, 100.

Further, while the engine 10 is the reciprocating engine with two cylinders in the above-described embodiments, it may be the reciprocating engine with a single cylinder or a rotary engine with a single rotor. This rotary engine includes an eccentric shaft as the drive shaft. In this case, since the engine 10 is the reciprocating engine with the single or the rotary engine with the single rotor and disposed so that its drive shaft extends in the vertical direction, the vertical length of the engine 10 can be shortened and the floor of the rear floor panel 90 can be made properly lower.

Also, while the engine 10 is disposed so that the drive shaft 10a extends in the vertical direction, it may be arranged so that the drive shaft 10a extends in the vehicle longitudinal direction or in the vehicle width direction. However, the arrangement of the engine 10 with the vertically extending drive shaft 10a may be preferable for the low floor. While the engine and generator 14 are attached to the sub frames 10, 110, 130 and 170 are, they may be attached to a cross member which extends in the vehicle width direction but does not have the sub frame. In this case this cross member is attached to the rear side frames 92, 94. Moreover, while the motor 16 is arranged in the vehicle-front space 44, it may be an inner-wheel motor which is disposed in wheel hubs of the front wheels 30, 32.

What is claimed is:
1. A rear vehicle body structure of a vehicle, comprising:
an internal combustion engine;
a generator drivable by the internal combustion engine;
a battery chargeable with an electric power generated by the generator;

an electric motor driving rear wheels with a supply of an electric power from the battery;
a rear floor panel extending rearwardly from a kick-up portion at a rear portion of a floor panel; and
a rear suspension suspending the rear wheels, the rear suspension comprising a lateral connecting member which extends in a vehicle width direction and connects to both rear-wheel supporting portions,
wherein said internal combustion engine is arranged below a rear seat which is provided on said rear floor panel and in front or back of said lateral connecting member of the rear suspension in a vehicle longitudinal direction, and said generator is arranged below the rear floor panel and in back of said internal combustion engine in the vehicle longitudinal direction.

2. The rear vehicle body structure of a vehicle of claim 1, wherein said internal combustion engine is a reciprocating engine with a single or two cylinders, and arranged at a central portion in a vehicle width direction below said rear floor panel so that a cylinder head thereof is directed rearwardly.

* * * * *